(12) United States Patent
Aratani et al.

(10) Patent No.: US 6,324,012 B1
(45) Date of Patent: *Nov. 27, 2001

(54) OPTICAL SYSTEM AND IMAGE PICKUP APPARATUS HAVING THE SAME

(75) Inventors: Michiharu Aratani, Kawasaki; Hiroaki Hoshi, Fujisawa, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/405,012

(22) Filed: Sep. 27, 1999

(30) Foreign Application Priority Data

Sep. 28, 1998 (JP) ................................. 10-290027
Sep. 9, 1999 (JP) ................................. 11-255659
Sep. 9, 1999 (JP) ................................. 11-255660

(51) Int. Cl.$^7$ ................................................ G02B 27/10
(52) U.S. Cl. ................ 359/627; 359/629; 359/631; 359/633; 359/637; 359/720; 359/729
(58) Field of Search ..................... 359/629, 627, 359/630, 631, 633, 634, 637, 676, 720, 728, 729, 731

(56) References Cited

U.S. PATENT DOCUMENTS

| | | | |
|---|---|---|---|
| 5,798,873 | 8/1998 | Hoshi et al. ................... | 359/692 |
| 5,825,560 | 10/1998 | Ogura et al. .................. | 359/822 |
| 5,880,888 | * 3/1999 | Schoenmakers et al. ........... | 359/631 |
| 5,917,662 | * 6/1999 | Sekita .......................... | 359/729 |
| 5,933,279 | 8/1999 | Yamazaki ....................... | 359/630 |
| 6,021,004 | * 2/2000 | Sekita et al. .................. | 359/631 |
| 6,023,373 | * 2/2000 | Inoguchi et al. ................ | 359/633 |
| 6,084,715 | * 7/2000 | Aoki et al. .................... | 359/627 |
| 6,094,241 | * 7/2000 | Yamazaki ....................... | 359/629 |
| 6,097,550 | * 8/2000 | Kimura ......................... | 359/729 |

FOREIGN PATENT DOCUMENTS

| | | |
|---|---|---|
| 8-292371 | 11/1996 | (JP) . |
| 8-292372 | 11/1996 | (JP) . |
| 9-5650 | 1/1997 | (JP) . |
| 10-39121 | 2/1998 | (JP) . |
| 10-221603 | 8/1998 | (JP) . |
| 11-109243 | 4/1999 | (JP) . |

* cited by examiner

Primary Examiner—Loha Ben
(74) Attorney, Agent, or Firm—Fitzpatrick, Cella, Harper & Scinto

(57) ABSTRACT

An optical system includes an optical element having a plurality of reflective surfaces integrally formed, at least one reflective surface out of the plurality of reflective surfaces of the optical element being a curved surface a normal to which at an intersecting point with a reference axis does not coincide with the reference axis, an image pickup element to which light successively reflected by the plurality of reflective surfaces is incident, and an optical member for making at least part of the light that ought to enter the image pickup element, travel in an optical path different from an optical path toward the image pickup element. The light made to travel in the different optical path by the optical member is utilized for a purpose other than image pickup by said image pickup element.

18 Claims, 14 Drawing Sheets

OPTICAL SYSTEM AND IMAGE PICKUP APPARATUS HAVING THE SAME

BACKGROUND OF THE INVENTION

1. Field of the Invention

The present invention relates to an optical system and an image pickup apparatus incorporating it and, more particularly, to those suitably applicable to image pickup apparatus of cameras, video cameras, still video cameras, etc. adapted to form an object image on a surface of an image pickup element by use of an optical system having off-axial reflecting surfaces a normal to which does not coincide with a reference axis.

2. Related Background Art

Viewing optical systems and optical systems for distance measurement and photometry used in the cameras, video cameras, etc. are often constructed so as to make use of rays passing through an image pickup optical system in order to avoid the influence of parallax. This method is generally called the TTL method.

On the other hand, there are conventionally known optical systems making use of an optical element of one block including many reflecting surfaces. Examples of such optical elements are a pentagonal roof prism, a Porro prism, etc., used in the finder system of a camera, and optical prisms, such as color separation prisms or the like, for separating light from a taking lens, for example, into three-color beams of red, green, and blue and forming an object image based on each color beam on a corresponding image pickup element surface.

An optical system of a single-lens reflex camera using the pentagonal roof prism will be described as a typical example of the optical system of the TTL method using an optical prism, referring to the sectional view illustrated in FIG. 1.

In FIG. 1, rays passing through the image pickup optical system 101 are reflected by a reflecting mirror 102 to form a primary image of an object on matt 103. After that, the light is guided via a viewing optical system composed of a condenser lens 104, an erecting prism (pentagonal prism) 105, and an eyepiece 106, to the eye. During photography, the reflecting mirror 102 is retracted out of the optical path, and an object image is formed on an image pickup surface 108 on which a photosensitive film, an image pickup element, or the like, is placed. The light reflected by the reflecting mirror 102 is also utilized for distance measurement and photometry in some cases.

The structure illustrated in FIG. 1, however, requires a sufficiently large space for the reflecting mirror 102 to be set in the optical path. For that reason the image pickup optical system is needed to have a large back focus, which increases the number of lenses in the image pickup optical system and increases the size of the image pickup optical system. The reflecting mirror 102 heretofore was a plane mirror having no optical power and was not utilized for correction for aberration.

Meanwhile, it has been clarified recently as to non-coaxial, optical systems that an optical system of well-corrected aberration can be constructed by introducing the concept of the reference axis and making its component surfaces of asymmetric, aspherical surfaces; for example, Japanese Patent Application Laid-Open No. 9-5650 discloses a design method thereof and Japanese Patent Applications Laid-Open No. 8-292371 and Laid-Open No. 8-292372 (both corresponding to U.S. Pat. No. 5,825,560) describe design examples thereof. Such non-coaxial, optical systems are called off-axial, optical systems (which are optical systems defined as optical systems including a curved surface (off-axial curved surface) a normal to which at an intersecting point of the component surface with the reference axis does not lie on the reference axis, where the reference axis is assumed to run along a ray passing the center of the image and the center of the pupil, the reference axis being of a bent shape).

In these off-axial, optical systems, the component surfaces are normally non-coaxial and do not bring about an eclipse even if they are reflective surfaces. Therefore, it is easier to construct an optical system of reflective surfaces. They also have such features that routing of the optical path is relatively free and that it is easier to construct an integral optical system by the technique of integrally molding the component surfaces.

SUMMARY OF THE INVENTION

An object of the present invention is to provide an optical system constructed of such an off-axial, optical system so as to realize downsizing of the whole optical system while being arranged to have no parallax between its optical paths, where the optical system is provided with an optical path (for example, the viewing optical path, the optical path for distance measurement and photometry, etc.) other than the photographing optical path.

For accomplishing the above object, an optical system according to a first aspect of the present invention comprises:

an optical element having a plurality of reflective surfaces integrally formed, wherein at least one reflective surface out of the plurality of reflective surfaces of the optical element is a curved surface a normal to which does not coincide with a reference axis at an intersecting point therewith;

an image pickup element to which light successively reflected by the plurality of reflective surfaces is incident; and optical means for making at least part of light that ought to enter the image pickup element, travel in an optical path different from an optical path toward the image pickup element.

The light made to travel in the different optical path by the optical means is utilized for a purpose other than image pickup by the image pickup element.

An image pickup apparatus according to a second aspect of the present invention is characterized by comprising the optical system according to the first aspect of the present invention.

DETAILED DESCRIPTION OF THE PREFERRED EMBODIMENTS

Figure 1:
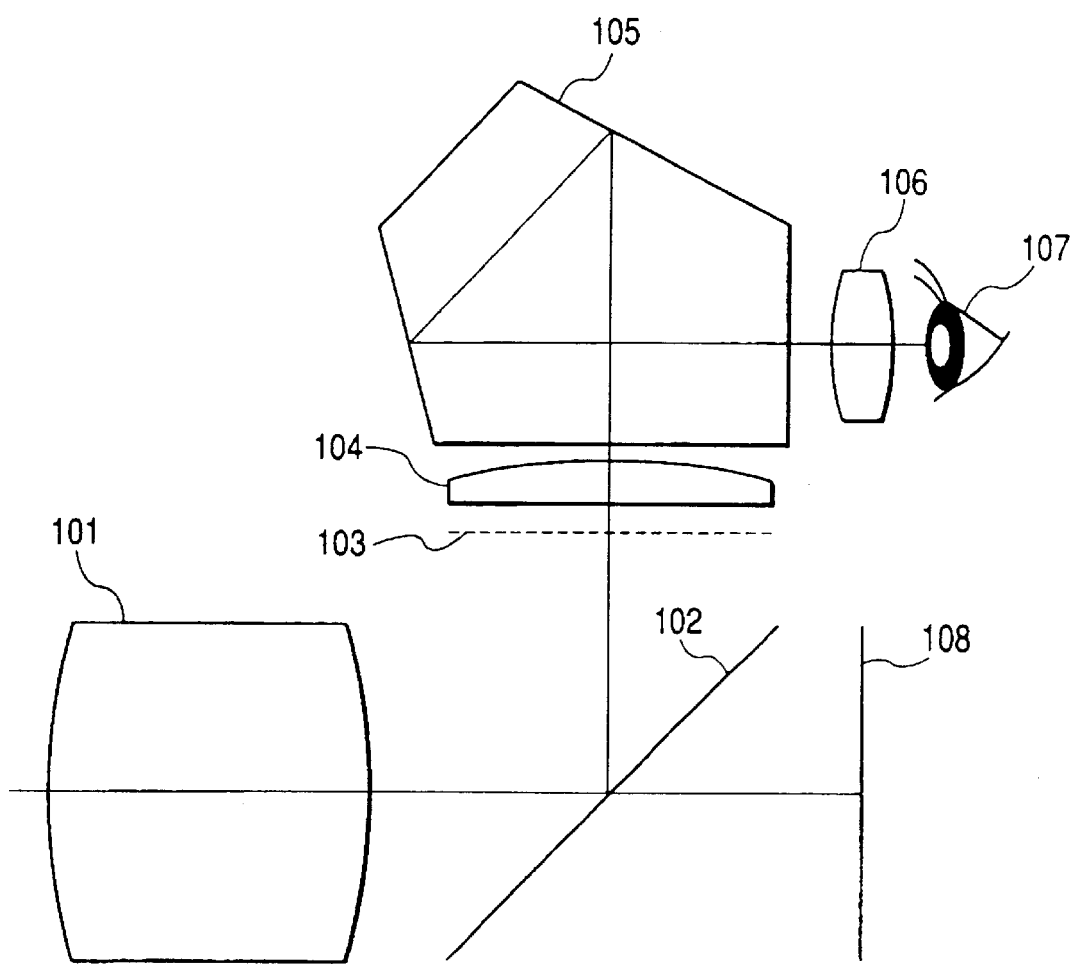
FIG. 1 is a schematic diagram to show the major part of an optical system in a conventional single-lens reflex camera.

Embodiments of the present invention will be described by reference to the drawings.

The definition of the off-axial, optical system and the reference axis as a frame thereof, which are frequently used in the present specification, follows the definition specified, for example, in Japanese Patent Applications Laid-Open No. 9-5650 and Laid-Open No. 10-39121, and thus the reference axis and the off-axial, optical system will be described briefly herein.

The optical systems according to the present invention do not have a symmetry axis like the optical axis in the ordinary optical systems composed of lenses. Therefore, the "reference axis" is set in the optical systems and the structure of various elements in the optical systems will be described on the basis of this reference axis.

The definition of the reference axis will be described first. In general an optical path of a certain ray of a standard wavelength as a reference from the object plane to the image plane is defined as a "reference axis" in the optical system. Since the ray of the reference cannot be determined by only this rule, a reference axis ray is normally set according to either of the following two rules.

(1) If in an optical system there exists an axis having symmetry even in part and if aberration can be handled well with good symmetry, a ray passing on the axis having the symmetry is defined as a reference axis ray.

(2) If in an optical system there generally exists no symmetry axis or if aberration cannot be handled with good symmetry though a symmetry axis exists in part, a reference axis ray is set to be a ray outgoing from the center of the object plane (the center of a range to be photographed or to be observed), passing the optical system in a designated order of surfaces of the optical system, and passing the center of a stop in the optical system or a ray passing the center of the stop in the optical system and reaching the center of the final image plane, and an optical path of the reference axis ray is defined as a reference axis.

The reference axis defined according to the above is generally of a bent shape. Here, let us define the following. In each surface an intersecting point of the surface with the reference axis ray is defined as a reference point of the surface, the reference axis ray on the object side of the surface is defined as an incident reference axis, and the reference axis ray on the image side thereof is defined as an outgoing reference axis. Further, the reference axis has a direction (orientation) and the positive direction is a direction in which the reference axis ray travels in imaging. Therefore, there exist a direction of the incident reference axis and a direction of the outgoing reference axis on the entrance side and on the exit side, respectively. In this way, the reference axis runs along the set sequence of the surfaces, changing its direction according to the optical rules of refraction or reflection or the like, to reach the image plane at last. In an optical element (optical system) composed of a plurality of surfaces, a reference axis ray incident to a surface closest to the object is defined as an incident reference axis of this optical element (optical system) and a reference axis ray emerging from a surface closest to the image is defined as an outgoing reference axis of the optical element (optical system). Further, the definition of directions of these incident and outgoing reference axes is the same as in the case of the surfaces.

In the present specification a reflective surface of a curved surface placed so as to be inclined with respect to the incident reference axis will be called an off-axial, reflective surface, and an optical element having an off-axial, reflective surface will be called an off-axial, optical element.

The embodiments of the present invention will be described below.

Figure 2:
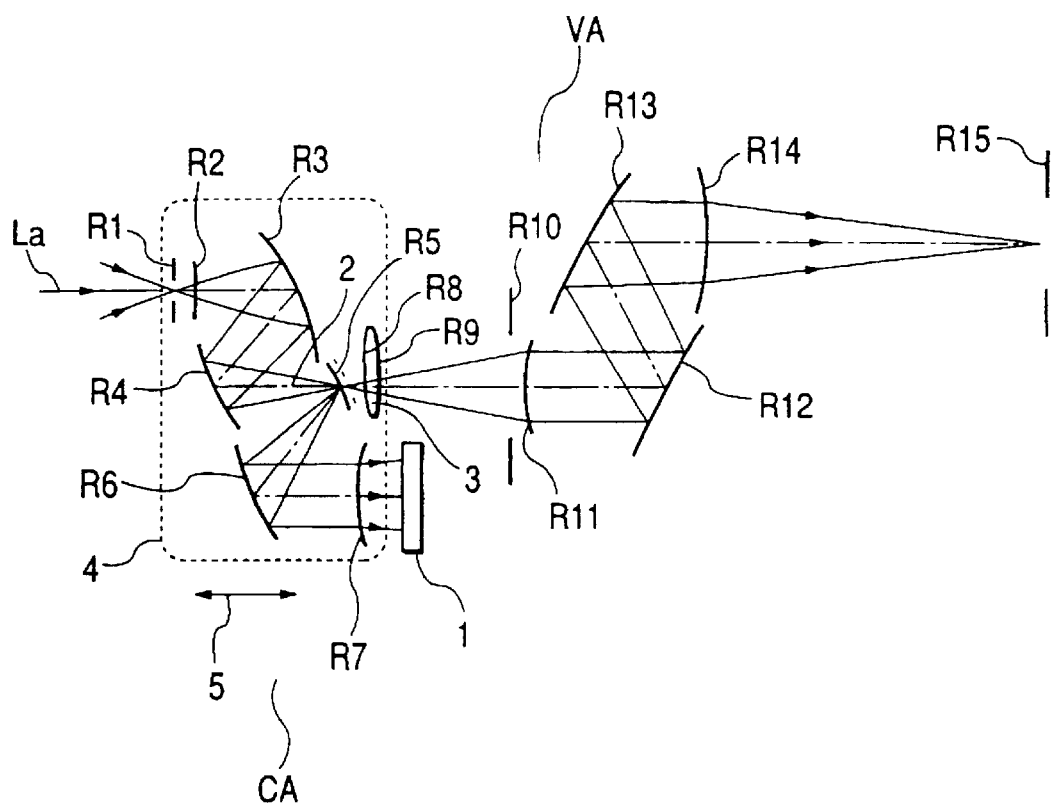
FIG. 2 is a schematic diagram to show the major part of an optical system of Embodiment 1.

FIG. 2 is a schematic diagram to show the structure of an optical system in an image pickup apparatus of Embodiment 1 according to the present invention. In FIG. 2, CA indicates an image pickup optical system and VA a viewing optical system. R1 designates a stop, R2 a refractive surface, R3, R4 off-axial, reflective surfaces, R5 an off-axial, half-reflective surface, R6 an off-axial, reflective surface, R7 a refractive surface, and 1 an image pickup element. Further, numeral 3 denotes a lens, R10 a field frame, R11 a refractive surface, R12, R13 off-axial, reflective surfaces, R14 a refractive surface, and R15 an eye point. The off-axial surfaces R3, R4, R5, R6 are formed as rotationally asymmetric, aspherical surfaces. In the figure, a chain line 2 indicates the reference axis of the optical system in the present embodiment.

The optical action of the optical system in the present embodiment will be explained below.

Rays La (only pupil principal rays of which are illustrated in FIG. 2) from the object not illustrated, having passed the stop R1, are incident to the refractive surface R2 and thereafter are reflected successively by the off-axial, reflective surfaces R3, R4. After that, the incident light is split into two optical paths by the off-axial, half-reflective surface R5 corresponding to the optical means of the present invention, which is a half-reflecting mirror; for example, about 50% of the incident intensity is reflected while about 50% is transmitted. The rays reflected by the off-axial, half-reflective surface R5 are then reflected by the off-axial, reflective surface R6 and thereafter are subjected to the refracting action of the refractive surface R7 to form an image on the image pickup element 1.

Namely, the optical system from the stop R1 via the surface R7 to the image pickup element 1 functions as a photographing optical system CA. On the other hand, the rays transmitted by the off-axial, half-reflective surface R5 and traveling in the optical path different from the optical path of the photographing optical system CA travel through the lens 3 to form an intermediate image at the position of the frame R10 and thereafter are subjected to the refracting action of the refractive surface R11. Then the rays are reflected successively by the off-axial, reflective surfaces R12, R13 and are then subjected to the refracting action of the refractive surface R14, then reaching the eye point R15.

The optical system from the stop R1 to the surface R15 functions as a viewing optical system VA. When the pupil of a viewer is placed at the position of the eye point R15, the viewer can visually check the image of the object and the photographing area indicated by the frame R10 accordingly.

Since the surface R5 is the half-reflective mirror, the optical paths do not have to be switched upon photography and the viewer can always visually confirm the object image from the eye point R15 upon photography. Further, the occurrence of parallax can be prevented by employing an entrance pupil common to the photographing optical system CA and the viewing optical system VA.

In the present embodiment the compact optical system is realized by using the reflective surfaces for the optical system and bending the optical axis. By forming the off-axial, reflective surfaces in the rotationally asymmetric, aspherical shape, the optical system is realized with good correction for aberration and without an eclipse even though it is a non-coaxial, optical system. If the surface R5 as an optical path splitting surface is also formed as an off-axial, reflective surface, the optical path splitting surface can also have refracting power and can also be utilized for correction for aberration. By using the off-axial surfaces for the viewing optical system after the optical path splitting surface R5, aberration correction can be easier in the whole of the viewing optical system including the optical surfaces before the optical path splitting surface.

In the present embodiment, the rays from the object form the intermediate image near the reflective surface R4. Such structure as to form the intermediate image in the optical system up to the frame R10 permits an erect image to be formed on the surface R10 or in the vicinity thereof, thus obviating the necessity for an erecting optical system, for example, such as an erecting prism.

The lens 3 is composed of the refractive surfaces R8 and R9. The refractive surfaces R8 and R9 both are aspherical surfaces rotationally asymmetric with respect to the optical axis and are off-axial surfaces. Normally, in cases using the off-axial surfaces, there occurs aberration asymmetric with respect to the optical axis. In the present embodiment, for example, the image pickup optical system CA from the stop R1 via the surface R7 to the image pickup element 1 is constructed so as to correct for aberration at the image pickup element 1 by use of the optical surfaces of the asymmetric shape with respect to the reference axis.

Therefore, when the optical path is split midway of the optical path of the photographing optical system of this type, there is a possibility that aberration remains in the rays after the split. In the present embodiment, the rotationally asymmetric, off-axial surfaces R8, R9 are used behind the optical path splitting means to correct for the remaining aberration, whereby the intermediate image can be obtained with good correction for aberration on the frame R10.

In the present embodiment the optical element including the surfaces R2, R3, R4, R5, R6, R7 is integrally molded with a mold. Likewise, the optical element including the surfaces R11, R12, R13, R14 is also integrally molded with a mold. This integral formation of plural optical surfaces permits a decrease in the number of parts of the entire apparatus and a decrease in cost and further obviates the necessity for adjustment of the relative positions between optical surfaces, in turn permitting simplification of assembly adjustment.

The optical element including the surfaces R2, R3, R4, R5, R6, R7, together with the lens 3, comprises a focus block 4 and they can move in the directions of arrows 5 together. This arrangement permits focus adjustment to be carried out so as to form the object image on the image pickup element 1 by moving the focus block 4.

In the present embodiment, the reference axis from the surface R9 to the field frame R10, the reference axis from the surface R7 to the image pickup element 1, and the moving directions 5 of the focus block 4 are approximately parallel to each other. For that reason, even with movement of the focus block (optical element) 4 during focus adjustment, the position of the object image formed on the image pickup element 1 does not move and the object position observed at the eye point R15 does not move, either.

In the present embodiment the focal length of the system from the surface R2 to the surface R9 is arranged so as to be approximately equal to the focal length of the system from the surface R2 to the surface R7. For that reason, the image is also in an in-focus state at the field frame R10 while the image is in focus on the image pickup element 1; therefore, the viewer can view a clear object image.

Although the present embodiment is arranged to carry out the focus adjustment by moving the focus block 4, the focus adjustment may also be carried out by moving the image pickup element 1. It is also possible to effect the focus adjustment by forming the focus block 4 in a non-integral structure and moving at least one of the optical surfaces comprising it. Diopter adjustment of the viewing system may also be carried out by moving the viewing optical system from the field frame R10 to the surface R14 together or by moving at least one of the optical surfaces composing it.

Figure 3:
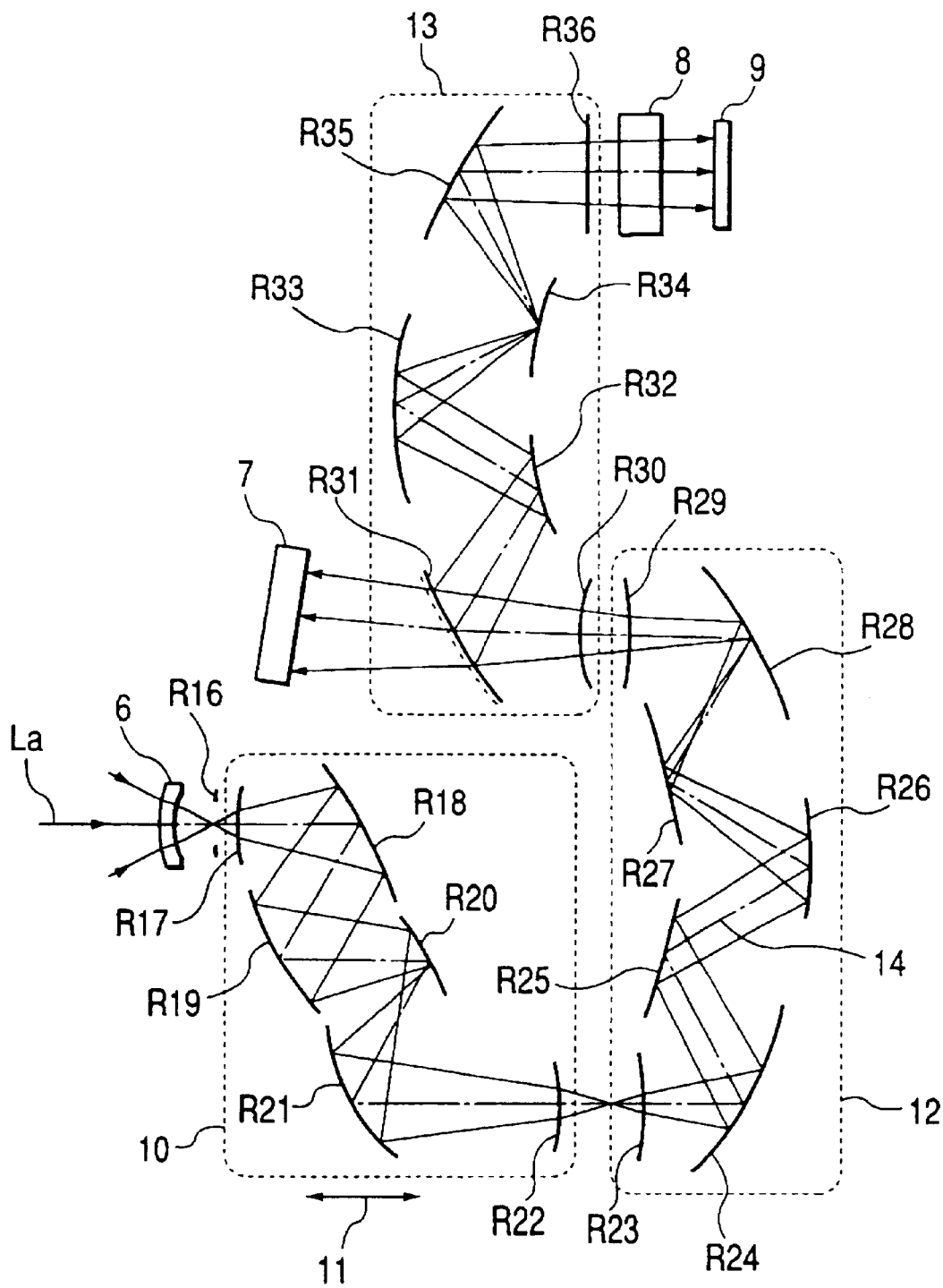
FIG. 3 is a schematic diagram to show the major part of an optical system of Embodiment 2.

FIG. 3 is a schematic diagram to show the major part of Embodiment 2 of the optical system in the image pickup apparatus of the present invention.

In the same figure each of numerals 10, 12, and 13 designates an optical element, which has entrance and exit surfaces and a plurality of off-axial, reflective surfaces.

Numeral 6 denotes a lens, R16 denotes a stop, R17, R22, R23, R29, R30, R36 denotes refractive surfaces, and R18, R19, R20, R21, R24, R25, R26, R27, R28, R31, R32, R33, R34, R35 denotes off-axial, reflective surfaces of the rotationally asymmetric, aspherical shape. Numeral 7 denotes a focus detecting means, 8 denotes an optical low-pass filter, and 9 denotes an image pickup element. The surfaces from R17 to R22 comprise one optical element, the surfaces from R23 to R29 comprise another optical element, and the surfaces from R30 to R36 comprise still another optical element.

The optical action of the optical system in the present embodiment will be described below.

After being subjected to the refracting action of the lens 6, the rays La (only pupil principal rays of which are illustrated in the figure) from the object, having passed the stop R16, are incident on the refractive surface R17 of the optical element 10 and thereafter are reflected successively by the reflective surfaces R18, R19, R20, R21 in the named order, to emerge from the refractive surface R22. After that, the rays are subjected to the refracting action of the refractive surface R23 of the optical element 12, and the rays are reflected successively by the reflective surfaces R24, R25, R26, R27, R28 in the named order, to emerge from the refractive surface R29. After that, the rays incident to the refractive surface R30 of the optical element 13 reach the reflective surface R31. The reflective surface R31 is constructed of a so-called dichroic mirror that transmits infrared light in the infrared wavelength region but reflects rays of shorter wavelengths than that region. Therefore, the infrared light among the rays reaching the reflective surface R31 is transmitted to reach the focus detecting means 7.

On the other hand, the visible light of the shorter wavelengths than it is reflected by the reflective surface R31 and thereafter is reflected successively by the reflective surfaces R32, R33, R34, R35 in the named order. Then the visible light is subjected to the refracting action of the refractive surface R36 and then passes through the optical low-pass filter 8 to be focused on the image pickup element 9.

In the present embodiment the reflecting optical system can be constructed with good correction for aberration even in the non-coaxial structure and without an eclipse, by forming the reflective surfaces of each optical element of the off-axial, reflective surfaces of the rotationally asymmetrical, aspherical shape. The compact optical system is also realized by bending the optical axis by the reflective surfaces.

The optical element 10 including the surfaces R17, R18, R19, R20, R21, R22 is integrally molded with a mold. The optical element 12 including the surfaces R23, R24, R25, R26, R27, R28, R29 is also integrally molded with a mold and, similarly, the optical element 13 including the surfaces R30, R31, R32, R33, R34, R35, R36 is also integrally molded with a mold. This integral structure of plural optical surfaces permits a decrease in the number of parts of the entire apparatus and a decrease in cost and also obviates the necessity for adjustment of the relative positions between the optical surfaces, in turn permitting simplification of assembly adjustment.

The optical element 10 is a block having the focusing function, which can be moved in the directions of arrows 11. The image pickup element 9 can be brought into the in-focus state by driving the optical element 10, based on information from the focus detecting means 7.

In the present embodiment the reflective surface R31 is constructed of the dichroic mirror that transmits only the infrared light, and the infrared light unnecessary for photography is used for focus detection. Therefore, the photographing optical system is bright, because the amount of visible light reaching the image pickup element 9 is not reduced. Since the infrared light, which could be the cause of disordering color balance, does not reach the image pickup element 9, the apparatus does not have to be equipped with an infrared cut filter, which had to be placed heretofore in the optical path up to the image pickup element, so that the number of parts can be decreased.

In the present embodiment the entrance pupil is common to the optical system up to the focus detecting means 7 and the optical system up to the image pickup element 9. This structure can prevent the occurrence of parallax (finder parallax) and in turn prevents the occurrence of an error of focus detection due to the parallax.

In the present embodiment the reflective surface R31 was the dichroic mirror, but it can also be a half mirror whose reflectance has no wavelength dependence. In the present embodiment the light split off by the reflective surface R31 was utilized for the focus detection, but it can also be utilized for photometry and dimming (light measuring means), of course.

When the optical path is split midway of the optical path of the photographing optical system, there is a possibility that aberration remains in the rays after the split. In such cases, an optical member for correction for the aberration may also be provided between the focus detecting means 7 and the reflective surface R31 as optical path changing means.

In the present embodiment the reflective surface as an optical means for preventing at least part of the light that ought to enter the image pickup element from being directed to the image pickup element was only one surface of the surface R31, but it is also possible to employ a plurality of such reflective surfaces as the optical means and use rays of optical paths changed and split off by the respective optical means, for photometry, distance measurement, the viewing optical system, and so on.

Although the detailed description was omitted in the present embodiment, zooming can be effected by driving the optical element 12 in the directions of arrows 11. The chain line indicated by 14 represents the reference axis and in the present embodiment the reference axis ray emerging from the optical element 10 is approximately parallel to the moving directions 11 of the optical element 10. The moving directions 11 of the optical element 12 are also approximately parallel to the reference axis ray incident to the optical element 12 and the reference axis ray outgoing from the optical element 12. In this structure, the reference axis after the movable blocks does not vary even with movement of the optical element 10 and the optical element 12 being the movable blocks. For that reason the zooming operation or the focus adjustment operation can be performed without deviation of the center position of the object image on the image pickup element 9 or on the focus detecting means 7.

In the case wherein the optical element 13 is arranged to move during the zooming operation, it is desirable to prevent the occurrence of defocus with the zooming operation, for example, by arranging the image pickup element 9 in a movable structure. In the case wherein the optical element 13 having the optical path splitting means is arranged to move during the zooming operation, it is desirable to make the focus detecting means 7 also movable or to prepare a separate optical system between the reflective surface R31 and the focus detecting means 7 and prevent focus variation on the focus detecting means 7 with the zooming operation by moving it.

As described above, the optical system can be accomplished in the decreased size of the whole optical system, with high optical performance, and with applicability to various photographing conditions and the image pickup apparatus using it can also be accomplished, by properly setting the structure of the off-axial, optical system having the entrance surface to which the light is incident, a plurality of reflective surfaces having curvature for successively reflecting the incident light, and the exit surface from which the light reflected by the plurality of reflective surfaces emerges.

Incidentally, in the image pickup optical systems (image pickup apparatus) using solid state image sensing devices, such as CCDs or the like, photometry, dimming, and white balance are normally carried out using the output signal from the CCD. Use of the signal from CCD posed problems of longer detection time and longer shutter time lag. Further, an error in an out-of-focus state of the object, i.e., an error of focusing, is detected using the signal from CCD and focusing is carried out based thereon. Detection of the focusing error is often carried out by detecting unsharpness of an image as an output of the image pickup element.

A method for detecting an amount of unsharpness (focusing error) from the signal of the image actually picked up is one called TV-AF, in which levels of a predetermined frequency band are monitored as focusing error signals through a band-pass filter for extracting only high-frequency components of the image signal, and in which a maximum signal level is assumed to indicate the in-focus state, which is generally employed.

Since the focusing lens is moved so as to increase the signal levels in order to detect the maximum peak position of the signal level, this method is called TV-AF of a hill climbing method.

In the TV-AF of the hill climbing method, since the peak of the signal level indicating the in-focus position is detected as a point of change from increase to decrease, it always necessitates a control across the in-focus position and the direction of the control cannot be detected without movement of the focusing lens.

Therefore, the drawbacks of the hill climbing method TV-AF are slow speed up to the in-focus state and low detection accuracy of the in-focus point.

Namely, the structure to carry out photometry, dimming, white balance, and focusing by use of the output signal from CCD has the problems of the long time necessary for the operation, a further longer shutter time lag, a failure in earning a shutter chance, an incapability of increasing the speed of continuous shoots, and so on.

The embodiment described below is for solving these problems.

Figure 4:
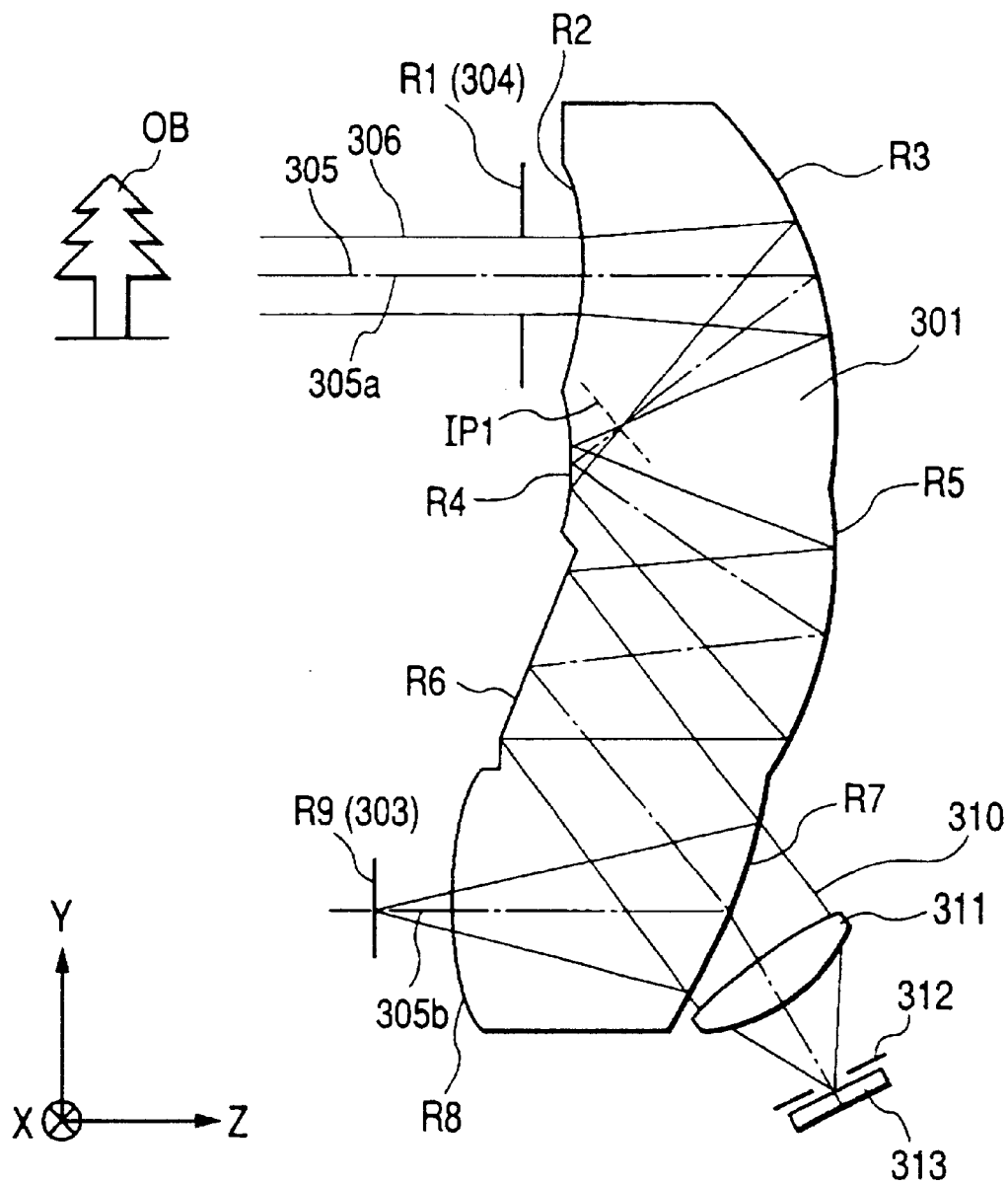
FIG. 4 is a sectional view to show the major part of an optical system of Embodiment 3.
Figure 5:
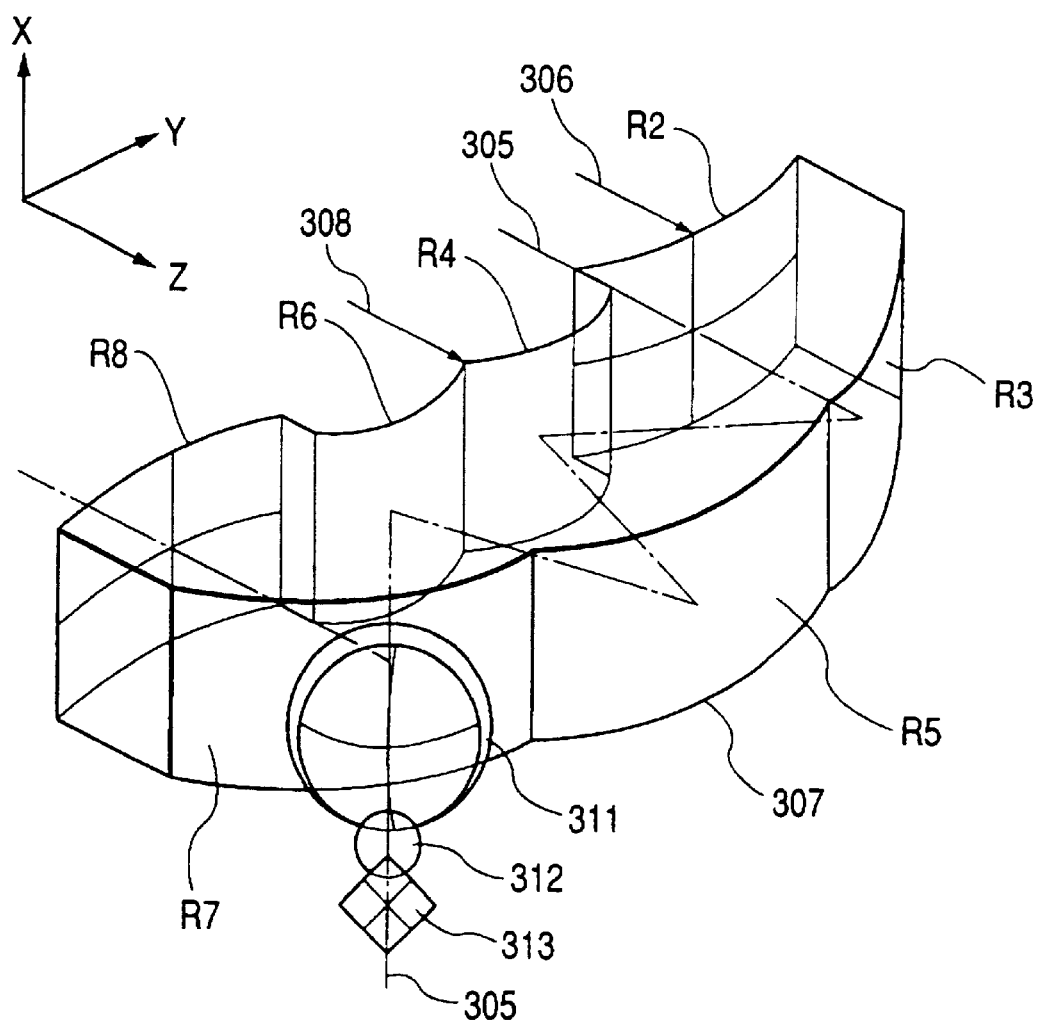
FIG. 5 is a perspective view to show the major part of the optical system of Embodiment 3.

FIG. 4 is a sectional view to show the major part of Embodiment 3 of the optical system in the optical apparatus of the present invention and FIG. 5 is a perspective view to show the major part of Embodiment 3 of the optical system in the optical apparatus of the present invention.

In FIG. 4, numeral 301 designates an optical element in which the entrance and exit surfaces and a plurality of reflective surfaces having curvature are formed in an integral form in surfaces of a transparent body. In the same figure, optical paths are also illustrated. The optical element 301 is made of an optically transparent, optical material, such as an optical glass, an optical plastic material, or the like, having a concave, refractive surface (negative, refractive surface) R2 which is a light incident surface, five reflective surfaces, which are a concave mirror R3, a convex mirror R4, a concave mirror R5, a convex mirror R6, and a concave mirror R7, and a convex, refractive surface (positive, refractive surface) R8 which is a light emergent surface, in the stated order from the object side.

These surfaces are rotationally asymmetric, aspherical surfaces to compose a non-coaxial, optical system, which is called an off-axis, optical system. R1 (304) is a stop (entrance pupil) placed on the object side of the optical element 301. R9 (303) is the final image plane, on which an image pickup surface of the image pickup element (image pickup medium), such as a two-dimensional CCD or the like, is located. Each of the stop R1 and the optical element 301 composes an element of the optical system. Numeral 305 denotes the reference axis of the optical system. The reflective surface R7 is close to the pupil of the optical system, the transmittance of an optically effective area thereof is set to 30%, and the reflective surface R7 composes a beam extracting means for extracting part 310 of the light from the object incident into the optical element 301. The light from the surface R7 is condensed through an aperture 312 on a four-divided photodetector 313 by an off-axial sensor lens 311 of a cylindrical lens base having an asymmetric, aspherical surface.

In the present embodiment, the light extracted by the beam extracting means is focused in a minimum spot at different positions in different directions within a surface normal to the direction of the light. The sensor lens 311 may also be constructed of a lens having different refracting powers in mutually orthogonal directions.

In the present embodiment the reference axis 305 is defined as an optical path (a chain line) of a ray passing the center of the stop 304 and reaching the center of the final image plane 303. A direction of the reference axis 305a incident to the optical element 301 on the image plane R2 is approximately parallel and opposite to a direction of the reference axis 305b emerging from the optical element 301 on the exit surface R8.

The optical action of the optical system in the present embodiment will be described next. The light 306 from the object OB is regulated in the amount of incident light by the stop 304 and thereafter is incident to the concave, refractive surface R2 of the optical element 301.

The object light 306 incident into the concave, refractive surface R2 is converted into diverging light by the power of the concave, refractive surface R2 and thereafter it is reflected by the concave mirror R3 to primarily form an object image on an intermediate image plane IP1 by the power of the concave mirror.

This imaging of the object image in the optical element 301 in the early stage restrains an increase in the ray-effective diameters of the surfaces disposed on the image side of the stop 304.

The object light 306 undergoing the primary imaging on the intermediate image plane IP1 is then repeatedly reflected successively by the convex mirror R4, the concave mirror R5, the convex mirror R6, and the concave mirror R7 while being affected by the powers of the respective reflecting mirrors. Then the light reaches the convex, refractive surface R8 and the object light 306 refracted by the power of the convex, refractive surface R8 forms an object image on the surface of image pickup element 303. In this way, the optical element 301 functions as an optical unit having the desired optical performance and having a positive power as a whole with effecting the refractions by the entrance and exit surfaces and the reflections by the plurality of reflecting mirrors having curvature. Focus adjustment (focusing) of the image detected by the CCD located on the final image plane R9 is carried out by moving the optical element 301 in the Z-direction. The CCD 303, the sensor lens 311, the aperture 312, and the four-divided photodetector 313 are fixed.

The light 310 extracted to the outside of the optical element 301 by the concave mirror R7 as the optical means of the present invention is refracted, off-axial aberration thereof is corrected for by the sensor lens 311, it is given predetermined astigmatism, an angle of view approximately at the center is selected by the aperture 312, and a spot is focused on the four-divided photodetector 313.

Next described is the perspective view of the optical element 301 illustrated in FIG. 5. In FIG. 5, the same numerals as those in FIG. 4 denote the same components.

In the present embodiment the optical element 301 is formed by forming reflective surface groups of a plurality of adjacent, reflective surfaces having curvature in the opposed relation in the surfaces of the transparent body, in addition to the pair of refractive surfaces for entrance and exit.

In FIG. 5, the concave mirror R3 as the first reflective surface of the optical element 301, the concave mirror R5 as the third reflective surface, and the concave mirror R7 as the final reflective surface of the optical element 301, which are disposed behind the concave, refractive surface R2 to which the light is incident from the object, compose a first reflective surface group 307 comprised of the three reflective surfaces formed in the adjacent arrangement in the Y-direction, as illustrated in FIG. 5.

Further, the convex mirror R4 as the second reflective surface of the optical element 301 and the convex mirror R6 as the fourth reflective surface, which are formed as opposed to the first reflective surface group 307, also compose a second reflective surface group 308 comprised of the two reflective surfaces in the integral form in the Y-direction, and the optical element 301 is composed of the first reflective surface group 307, the second reflective surface group 308, and the entrance and exit refractive surfaces R2, R8.

In the present embodiment, the generating line and meridian line of the cylindrical lens as a basis of the sensor lens 311 lie in the YZ plane including the reference axis 305 and in a plane being perpendicular thereto and including the X-axis, respectively.

Against it, each of parting lines of the four-divided photodetector 313 is placed as inclined at 45° about the reference axis 305 relative to the YZ plane, as illustrated in FIG. 5.

Figure 6A:
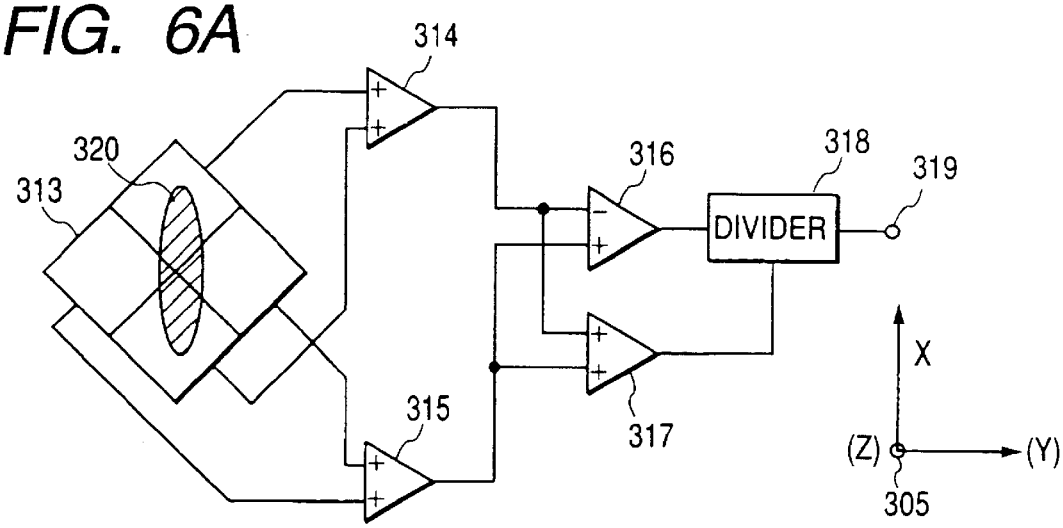
FIG. 6A, FIG. 6B, FIG. 6C, FIG. 6D and FIG. 6E are explanatory diagrams for explaining a photodetector in the optical system of Embodiment 3.
Figure 6B:
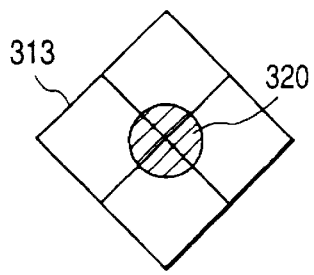
Figure 6C:
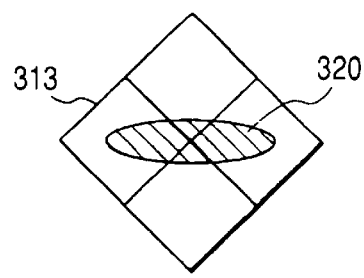

FIGS. 6A to 6C are schematic diagrams to show relations between the four-divided photodetector 313 and light amount distribution of the light spot 320 formed thereon, according to defocus states of the object.

FIG. 6B shows the in-focus state in which the light spot 320 is focused in an approximately symmetric circle as a least circle of confusion on the surface of the four-divided photodetector 313.

FIG. 6A shows an example of light amount distribution of the spot 320 in a defocus state on the photodetector 313. In FIG. 6A the beam 320 is relatively divergent because of the defocus when compared to the beam in the in-focus state, and it will be incident to the photodetector 313 before formation of the focused spot without use of the sensor lens 311. However, the sensor lens 311 works to make the beam just in focus in the YZ plane (more precisely, in a plane spanned by the Y-axis and the reference axis 305), thereby forming the vertically long, elliptic spot 320.

Sums of opposite outputs out of outputs from four photodetective areas of the four-divided photodetector 313 are computed using adders 314, 315 and a difference between their outputs is computed using a subtractor 316. The subtractor 316 outputs a negative output that reflects the asymmetry of the light amount distribution of the vertically long, elliptic spot 320.

On the other hand, an adder 317 computes the sum of the above sums and a divider 318 divides the output of the difference circuit 316 by the sum to obtain a focusing error signal 319. Since the output of the adder 317 corresponds to the overall light amount of the spot 320, the output is normalized by the light amount when the difference signal output 316 is divided by the output of the adder 317; this can decrease cross-talk to the focusing error signal due to a variation in brightness of the object, an aperture value, and so on.

FIG. 6C shows another example of the spot 320 on the photodetector 313 in a defocus state in the reverse direction to FIG. 6A. Since the beam 320 is relatively convergent when compared to that in the in-focus state, the spot will be focused in front of the photodetector 313 without use of the sensor lens 311. However, the sensor lens 311 works to focus the beam just in the ZX plane (the plane spanned by the reference axis 305 and the X-axis), forming a laterally long, elliptic spot 320 this time.

The defocus error signal 319 in this case is a positive signal that reflects the asymmetry of the spot 320, opposite to that of FIG. 6A.

Figure 6D:
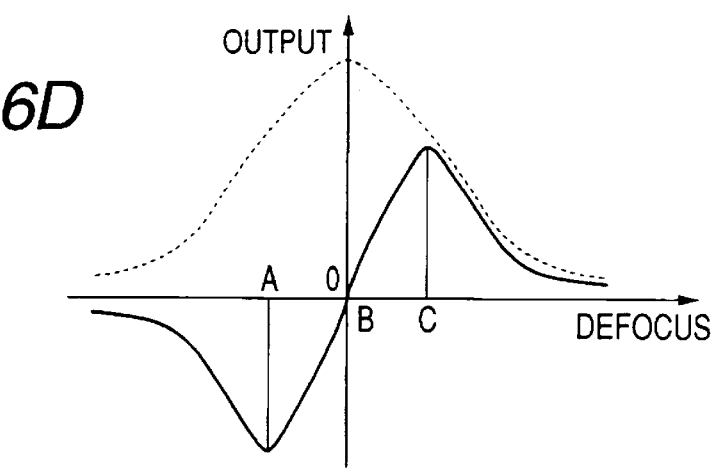

FIG. 6D schematically shows change of the focusing error signal output 319 with the defocus along the axis of the abscissas. At large defocus amounts, unsharpness of the spot 320 is great and the asymmetry of light amount distribution is small; thus the error signal output 319 is small. With a decrease in the defocus amount, the spot becomes closer to the elliptic shape, so that the asymmetry of light amount distribution appears. Thus, the error signal 319 has a peak according to the astigmatism given by the sensor lens 311.

The negative peak A of FIG. 6D corresponds to the state of FIG. 6A and the positive peak C to the state of FIG. 6C. With a further decrease in the defocus amount, the spot 320 becomes closer to the least circle of confusion in the focused state and the asymmetry is canceled; therefore, the error signal output 319 gradually approaches zero. In the in-focus state corresponding to FIG. 6B, the light amount distribution becomes symmetric at last, so that the error signal 319 becomes zero. It is the point B in FIG. 6D.

Since the focusing error signal output 319 draws the S-shaped curve as described above, the in-focus state can be maintained by effecting negative feedback control for the Z-directional position control of the optical element 301 using this error signal 319 in the range of point A to point B in FIG. 6D. A curve indicated by a dashed line in FIG. 6D represents change of overall light amount output 317. Since whether the defocus is within the range of point A to point B can be determined from levels of the overall light amount output 317, the system can be prevented from falling into a disabled state of focusing.

Figure 7A:
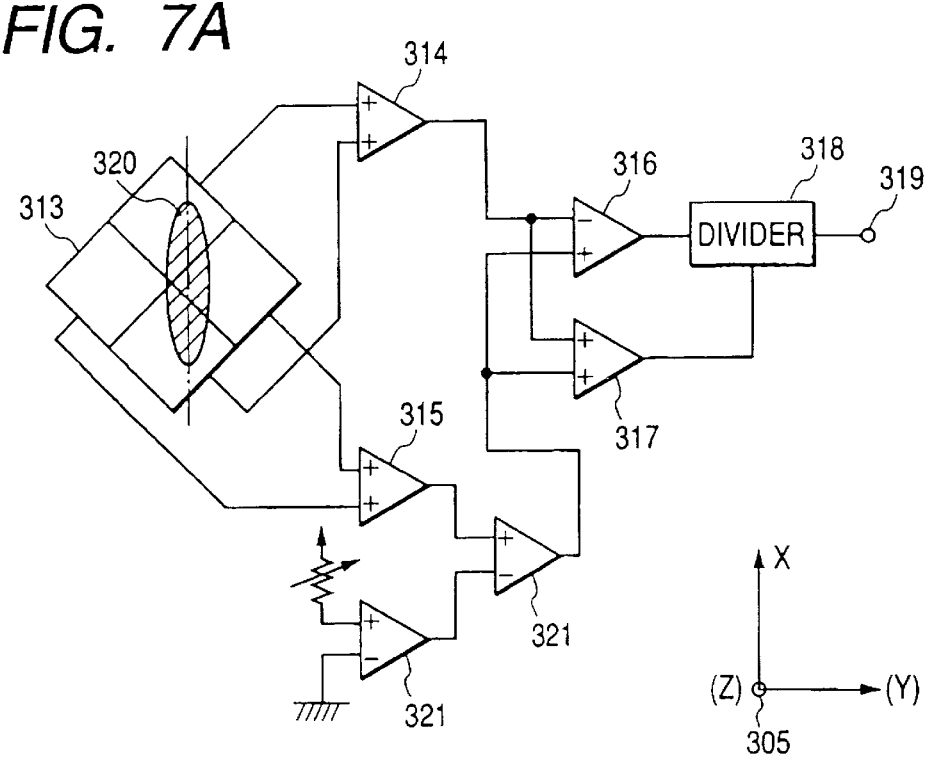
FIG. 7A and FIG. 7B are explanatory diagrams for explaining the photodetector in the optical system of Embodiment 3.
Figure 7B:
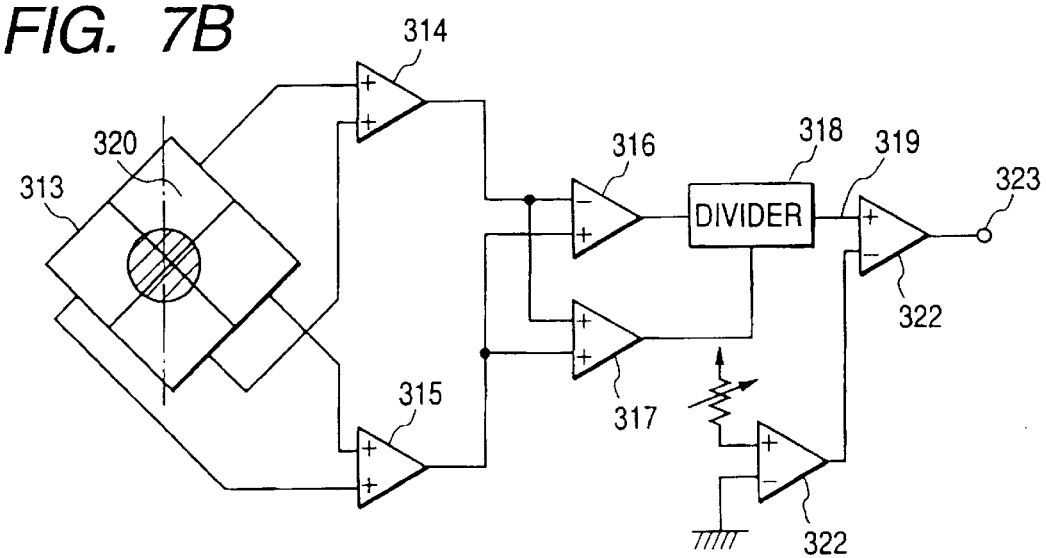

In the present embodiment, focusing is effected by moving the optical element 301 relative to the CCD (the surface R9) in the Z-direction, but the axis 305 of the system of the photodetector 313 for obtaining the focusing error signal 320 is not parallel to the Z-axis in the YZ plane, i.e., it makes an angle therewith; therefore, the spot theoretically deviates in the lateral direction on the plane of FIGS. 6A–6C Such states are illustrated by relations between the spot 320 and the photodetector 313 in FIG. 7A and FIG. 7B.

In the structure of the present invention, the parting lines are provided along the directions of 45° to the major axis and the minor axis of the spot of the asymmetric light amount distribution, for example, of an ellipse, the sums of the opposite areas are computed by the adders 314, 315, and the difference between them is detected by the subtractor 316; therefore, the deviation can be canceled to some extent in the lateral direction (within the YZ plane) and in the vertical direction (in the X-direction) in FIGS. 7A and 7B.

Therefore, the cross-talk of the positional deviation to the focusing error signal due to the difference between the moving direction and detecting direction of focusing can be ignored within the range permitted by specifications of the optical system.

Further, it is possible to add a cross-talk correcting circuit 321 or 322 as illustrated in FIG. 7A or in FIG. 7B, which can adjust levels of one pair of opposite outputs from the photodetector so as to achieve a zero cross at the in-focus position, if the cross-talk exceeds the permissible value. It is also possible to store such adjustment levels in the form of curves according to preset object distances and apertures and adaptively adjust and correct the output levels, based thereon.

Embodiment 4 of the present invention will be described next. Embodiment 3 showed the example in which the in-focus state was achieved by carrying out the focusing control using only the focusing error signal 319 obtained from the four-divided photodetector 313.

In addition to this focus detecting method, the present invention can also be combined with the so-called hill climbing TV-AF method of the prior art example, which is an efficient method, depending upon the aim of the product. Namely, the focusing error signal is obtained directly from the image of CCD by the TV-AF method; however, in cases wherein defocus amounts are great or wherein the determination of whether the control direction is positive or negative is not carried out well by the hill climbing TV-AF method as during the detection of the in-focus peak position, the total speed of focusing control can be increased by the use of the control signal 319 from the four-divided photodetector 313.

Figure 6E:
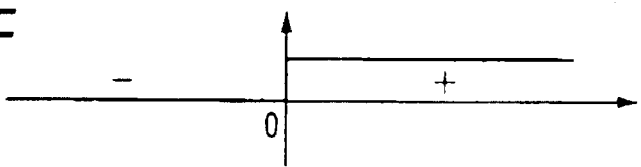
Figure 8:
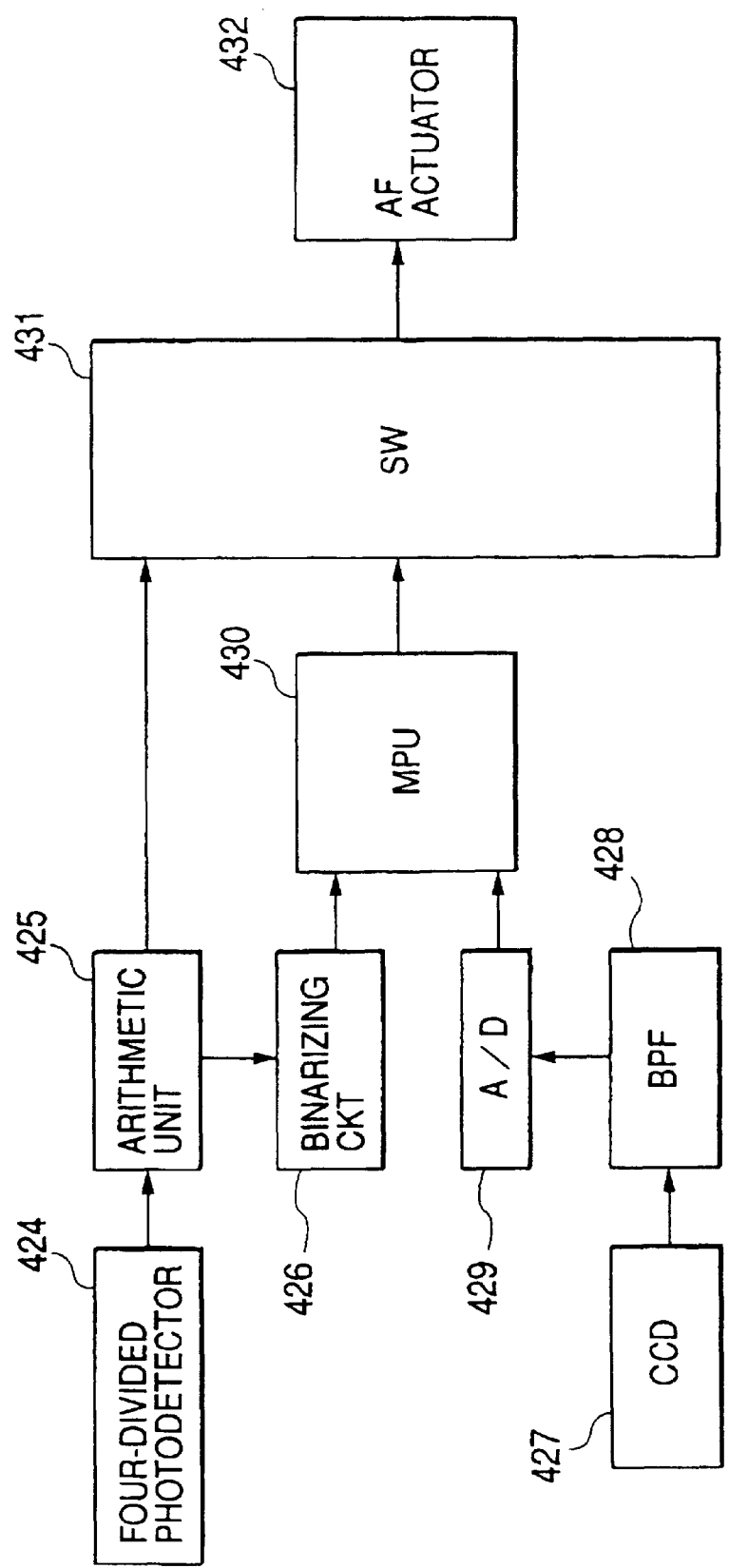
FIG. 8 is an explanatory diagram for explaining the photodetector in the optical system of Embodiment 4.

The block diagram illustrated in FIG. 8 shows an example in which a quicker focusing operation is implemented by switching between the focusing error signal obtained from the four-divided photodetector and the focusing error signal obtained by the hill climbing TV-AF method. In FIG. 8, the output from the four-divided photodetector 424 is supplied to an arithmetic unit 425 as illustrated in FIG. 6A or in FIG. 7A or 7B to remove cross-talk or the like as described above, so as to obtain the focus error signal as illustrated in FIG. 6D. The output is binarized as illustrated in FIG. 6E, by a binarizing circuit 426. The H level indicates the positive deviation of focusing, while the L level the negative deviation thereof.

On the other hand, also prepared is the hill climbing method TV-AF to drive a focusing actuator 432 so that a signal level extracted by a band-pass filter (BPF) 428 from the output of CCD 427 becomes a maximum peak. The output of BPF 428 is also converted into a digital signal by A/D converter 429 and the digital signal, together with the output from the aforementioned binarizing circuit, is inputted into MPU 430.

In the hill climbing method the direction of movement of the actuator 432 to the in-focus position is determined first after the actuator 432 is moved to detect a change with respect to a stored signal level before the movement. In order to find out a maximum of signal, it is necessary to store levels of respective signals, compare signal levels before and after, and find out a point of change from positive to negative in the signal levels.

Namely, the maximum can be found out first after it is confirmed that the signal levels start decreasing over the maximum. Therefore, the actuator needs to be controlled to the maximum by reverse driving thereof after the maximum has been found. Further, since absolute values of signal levels vary depending upon images, it is not easy to narrow a searching area. In addition, the resolving power increases and the maximum becomes easier to determine with a decreasing pitch of movement of the actuator. However, the focusing from a defocus position will take an extremely longer time as the pitch decreases.

On the other hand, the possibility of overpassing over the maximum becomes higher with increasing pitch, and whether a signal level exceeding the maximum cannot be detected unless further movement is carried out.

It thus becomes possible to control the actuator 432 in the vicinity of the in-focus position at a high speed by referencing the direction discriminating signal of the focusing error from the four-divided photodetector 424, i.e., the output of the binarizing circuit 426, without referencing the signal of the hill climbing method.

The final control to the in-focus position is carried out using the error signal of the hill climbing method TV-AF extracted from the actual image. The reason for this is as follows. Focusing targets appearing most frequently are three-dimensional objects in actual cameras, and in selection of an area to be focused, selection of an object, etc., correspondence of focusing to an image is easier to make with the error signal of the hill climbing method TV-AF than with the error signal based on astigmatism to judge purely the physical convergence or divergence of the beam.

Since the system of the present embodiment is arranged to judge the error signal levels of the two methods by the MPU 430 and properly switch signals for control of the actuator 432 by changeover switch (SW) 431, the structure of the present embodiment permits finer focusing control, as well as an increase in the speed of focusing.

Although the above embodiment was described as an example of control with analog signals for description's sake, it is a matter of course that the two error signals can undergo A/D conversion to be processed in the MPU, thereby increasing the degrees of freedom and decreasing the number of analog parts in the circuitry.

Figure 9:
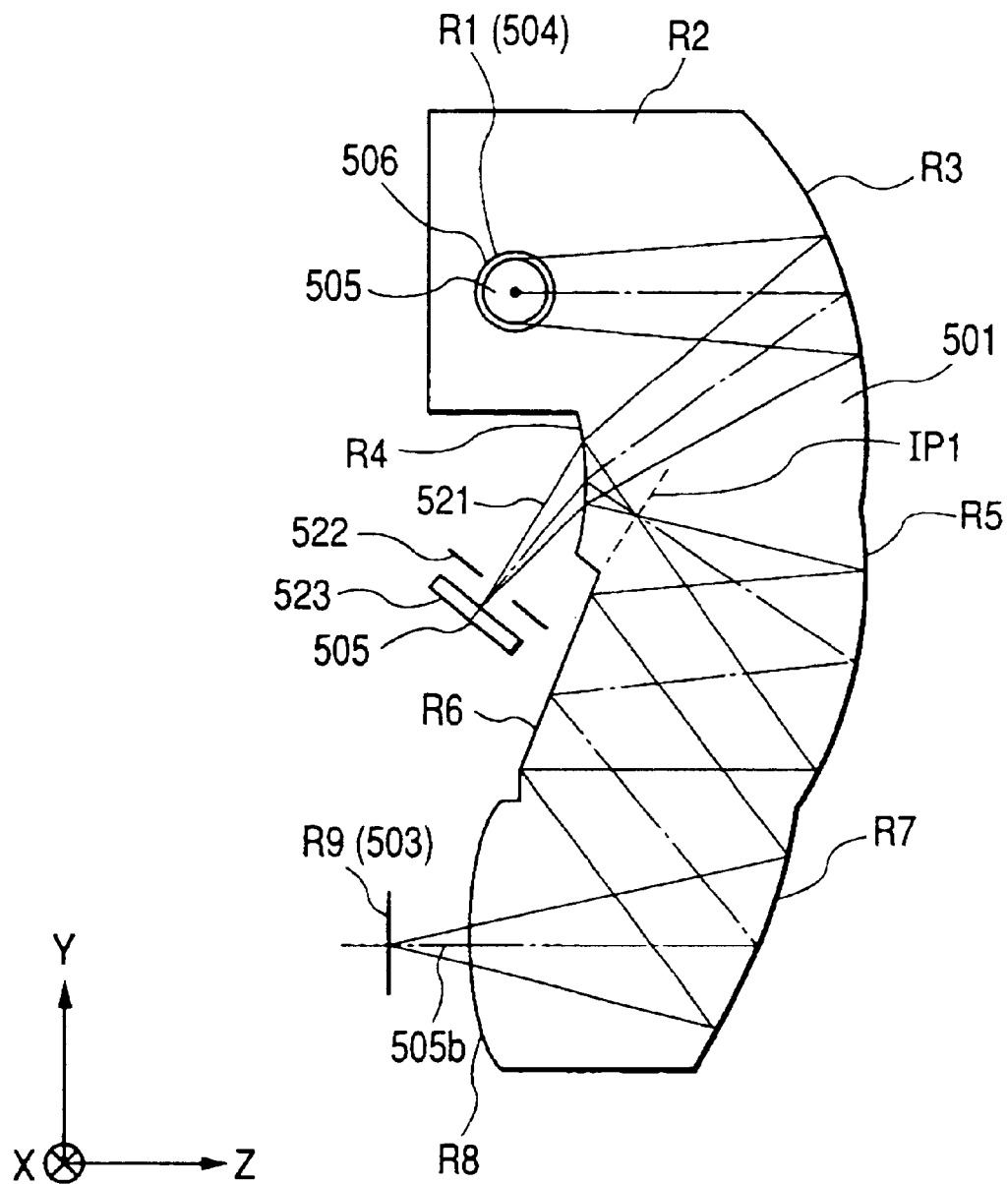
FIG. 9 is a sectional view to show the major part of an optical system of Embodiment 5.
Figure 10:
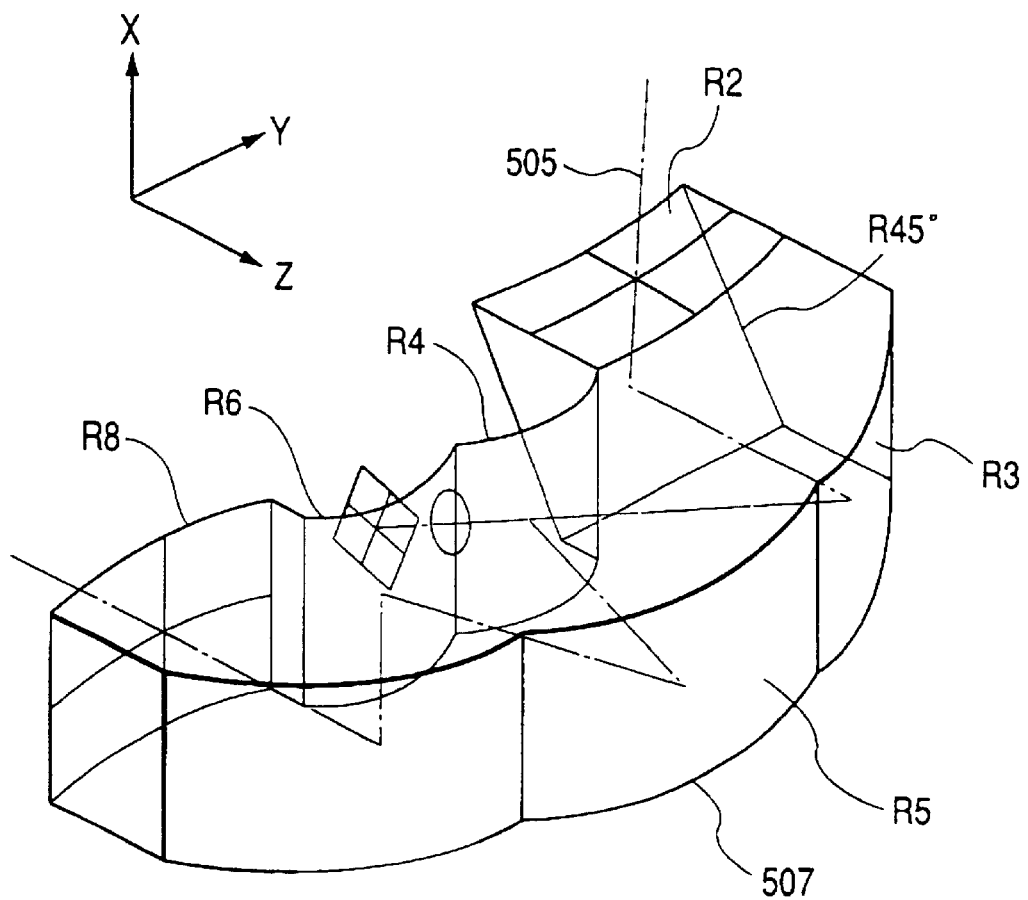
FIG. 10 is a perspective view to show the major part of the optical system of Embodiment 5.

FIG. 9 is a sectional view of the major part of Embodiment 5 of the optical system in the image pickup apparatus of the present invention and FIG. 10 is a perspective view to show the major part of Embodiment 5 of the optical system in the image pickup apparatus according to the present invention.

The present embodiment is an example of the application of the present invention to the optical element suggested in Japanese Patent Application Laid-Open No. 11-109243.

In the optical element of the present embodiment, astigmatism independent of angles of view is generated on purpose at the intermediate image position. This decreases the influence of such defects as bubbles, dust, foreign matter, etc., which could pose a problem at the intermediate image position, on the image.

In the present embodiment, the intermediate image position IP1 is located midway between a convex, reflective surface R4 and a concave, reflective surface R5, the reflective surface R4 is the optical means of the present invention, and the transmittance of the optically effective area of the reflective surface R4 is 30%, whereby the beam 521 for focusing is extracted to the outside out of the optical element 501.

The beam 521 refracted by and emitted from the reflective surface R4 already has astigmatism as described above and is converging light; therefore, the present embodiment does not require the sensor lens which was used in the aforementioned embodiment. The system of the present embodiment can be constructed in such structure that the CCD, and the aperture 522 and four-divided photodetector 523, disposed normally to the reference axis 505, are fixed.

In the present embodiment a balance needs to be made between the astigmatism for preventing the optical degradation due to the dust in the optical element and the astigmatism for obtaining the focusing error signal with high sensitivity.

The light 521 is guided through the aperture 522 to select the angle of view approximately at the center and the light is condensed on the four-divided photodetector 523. The directions of elliptic spots due to the astigmatism of the light 521 are the same as in the previous embodiment, which are the vertically long, elliptic circle in the X-axis direction and the laterally long, elliptic circle in the YZ plane normal thereto.

Therefore, the directions of the parting lines of the four-divided photodetector 523 are also similar to those in the previous embodiment; i.e., they are inclined at an angle of 45° relative to the YZ plane about the reference axis 505 within the surface of the photodetector 523.

In the present embodiment, a 45°-reflecting surface R45° is interposed between the entrance surface R2 and the reflective surface R3 in order to realize a low-profile digital camera, so that the direction of incidence of light is the X-direction. However, because the image on the CCD will be shifted if the optical element is moved in the X-direction for the focusing control, the optical element 501 is arranged to move in the Z-direction, as in the case of the above embodiment.

The present embodiment showed an example without the sensor lens so as to include the minimum number of parts, but it is a matter of course that the sensor lens for correction for off-axial aberration of the light 521 can also be interposed in order to make a balance between the countermeasures against the dust and the detection of focusing error.

However, in the case wherein the focusing error detection by astigmatism is mainly used for the determination of direction and wherein the focusing error detection by the hill climbing method TV-AF is used for the final focusing as in the embodiment illustrated in FIG. 8, an offset of the focusing error signal waveform due to the astigmatism can be corrected for in a range in which no trouble is caused in the determination of direction, by the correcting circuit 321 or 322 as illustrated in FIG. 7A or FIG. 7B.

Figure 11:
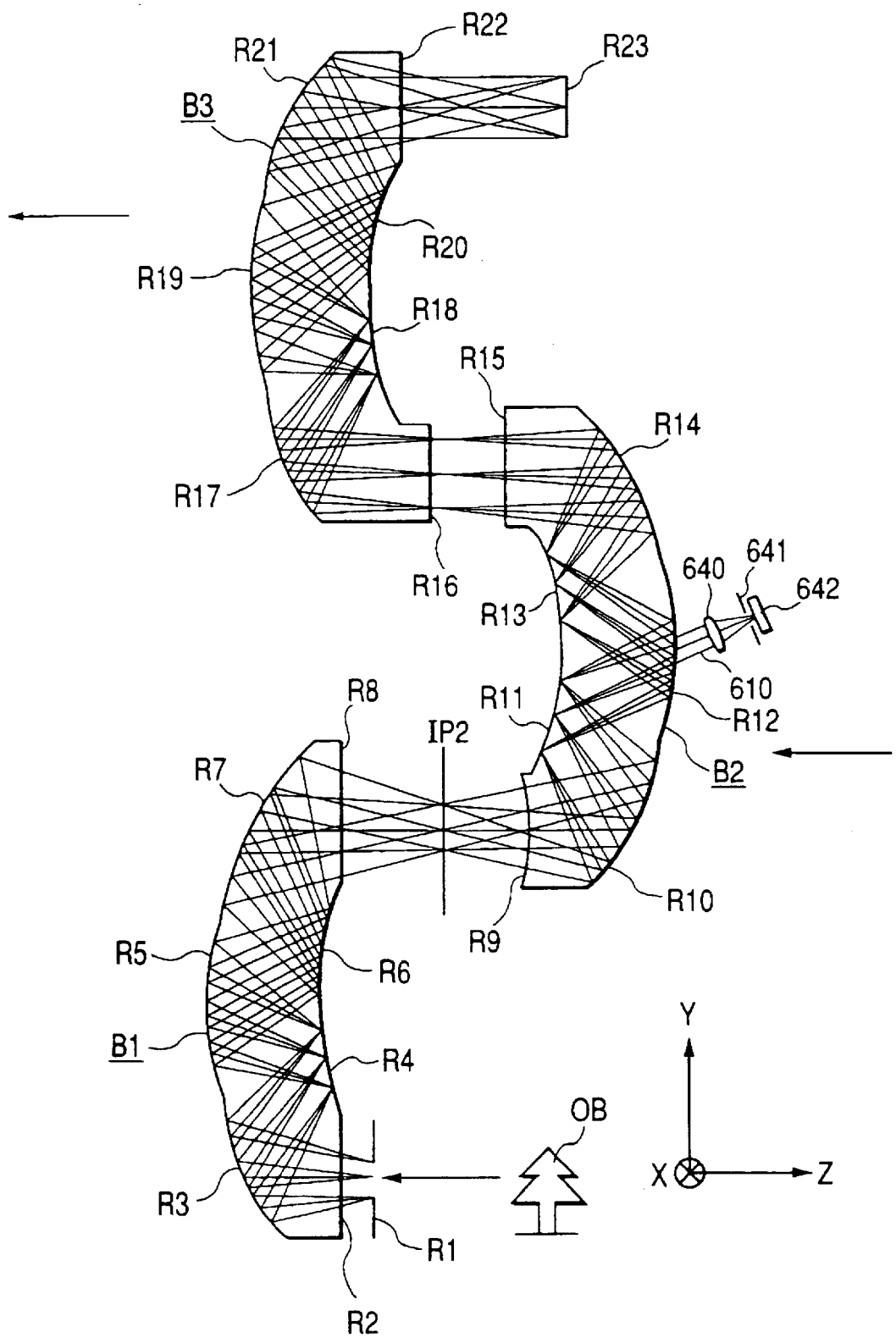
FIG. 11 is a sectional view to show the major part of an optical system of Embodiment 6.

FIG. 11 is a sectional view of the major part of Embodiment 6 of the optical system in the optical apparatus of the present invention. The present embodiment shows an example of a zoom optical system using a plurality of optical elements, as an optical system used in the optical apparatus.

The zoom optical system of FIG. 11 is an example in which a three-fold zoom ratio is realized by three units (three optical elements B1, B2, B3). In FIG. 11, the first surface is a stop surface R1 as the entrance pupil. The second surface R2 to the eighth surface R8 compose the optical element B1, the ninth surface R9 to the fifteenth surface R15 compose the optical element B2, and the sixteenth surface R16 to the twenty second surface R22 compose the optical element B3.

Zooming is effected by changing the relative positions of the first, second, and third optical elements B1, B2, B3. The twenty third surface R23 is the image plane, on which the CCD is located.

The light from the object OB is incident through the stop (entrance pupil) R1 into the first optical element B1, is refracted by the second surface R2, is successively reflected by the third surface R3, the fourth surface R4, the fifth surface R5, the sixth surface R6, and the seventh surface R7, and is then refracted by the eighth surface R8 to emerge from the optical element B1. An intermediate image is formed near the surface R4 in the optical element B1. Further, a secondary image is formed at the position IP2 between the optical element B1 and the optical element B2.

The light from the object focused at the position IP2 is incident into the optical element B2, and the incident light is refracted by the ninth surface R9, is successively reflected by the tenth surface R10, the eleventh surface R11, the twelfth surface R12, the thirteenth surface R13, and the fourteenth surface R14, and is then refracted by the fifteenth surface R15 to emerge from the optical element, B2. In this element an intermediate image is formed between the surface R12 and the surface R13. A pupil is formed near the surface R15.

The light emerging from the optical element B2 and entering the optical element B3 is refracted by the sixteenth surface R16, is reflected successively by the seventeenth surface R17, the eighteenth surface R18, the nineteenth surface R19, the twentieth surface R20, and the twenty first surface R21, and is then refracted by the twenty second surface R22 to emerge from the optical block B3. In this element, an intermediate image is formed near the surface R18.

The light emerging from the optical block B3 forms an object image on the twenty third surface R23 being the final image plane. Specifically, the CCD is placed at the position of R23.

Movement of each optical element with the zooming operation is as follows; the first optical element B1 is fixed, the second optical element B2 is moved in the negative Z-direction from the wide-angle extreme to the telephoto extreme, and the third optical element B3 is moved in the negative Z-direction from the wide-angle extreme to the telephoto extreme. The twenty third surface R23 being the image plane does not move during the zooming. With zooming from the wide-angle extreme to the telephoto extreme, the gap becomes narrower between the optical element B1 and the optical element B2, the gap becomes wider between the optical element B2 and the optical element B3, and the gap becomes wider between the optical element B3 and the image plane R23.

The optical path length of the overall system varies in the increasing direction between the first surface R1 and the twenty third surface R23 from the wide-angle extreme to the telephoto extreme. The incident and outgoing reference axes are parallel and opposite to each other in each of the three optical elements B1, B2, B3. The low-profile zoom lens is constructed by employing the zooming structure to effect the relative movement of the thin optical elements in one plane as described above.

Since focusing is carried out by moving the second optical element B2, the reflective surface R12 near the intermediate image in the optical element B2 is used as a beam extracting means (optical means) and the transmittance of the reflective surface R12 is set to 20%, whereby the light 610 for the detection of focusing error signal is extracted out of the optical element B2. The extracted light is subjected to correction for off-axial aberration and is focused through the aperture 641 on the four-divided photodetector 642 by the sensor lens 640 giving the predetermined astigmatism, as in the case of Embodiment 3.

As described above, the present embodiment is implemented by providing the extracting surface of the focusing error signal in the optical path of the optical element for focusing and can also be applicable to other optical apparatus composed of a plurality of optical elements, like the zoom lens.

As described above, the optical element is constructed in a structure wherein the object image is formed on the predetermined surface by making use of the optical element in which the entrance surface to which the light is incident, the plurality of reflective surfaces having curvature, and the exit surface from which the light reflected by the plurality of reflective surfaces emerges, are integrally formed in the surfaces of the transparent body, wherein at least one reflective surface of the optical element is provided with the means for extracting part of the light to the outside of the optical element, and wherein the extracted light is provided with the predetermined optical property, whereby an optical element can be obtained in a compact and simplified structure of the overall optical system and with the capability of readily obtaining the focusing error signal with high accuracy, and whereby the optical apparatus using it can also be achieved.

Further, the optical element is constructed in a structure wherein the entrance surface to which the light is incident, the plurality of reflective surfaces having curvature, and the exit surface from which the light reflected by the plurality of reflective surfaces emerges, are integrally formed in the surfaces of the transparent body, wherein part of the light is extracted from at least one reflective surface, and wherein the detection of focusing error signal using astigmatism is carried out with the extracted light, whereby an optical apparatus can be produced so as to realize fast and accurate focusing control while maintaining the compact and simplified structure of the optical element and the optical system.

Figure 12:
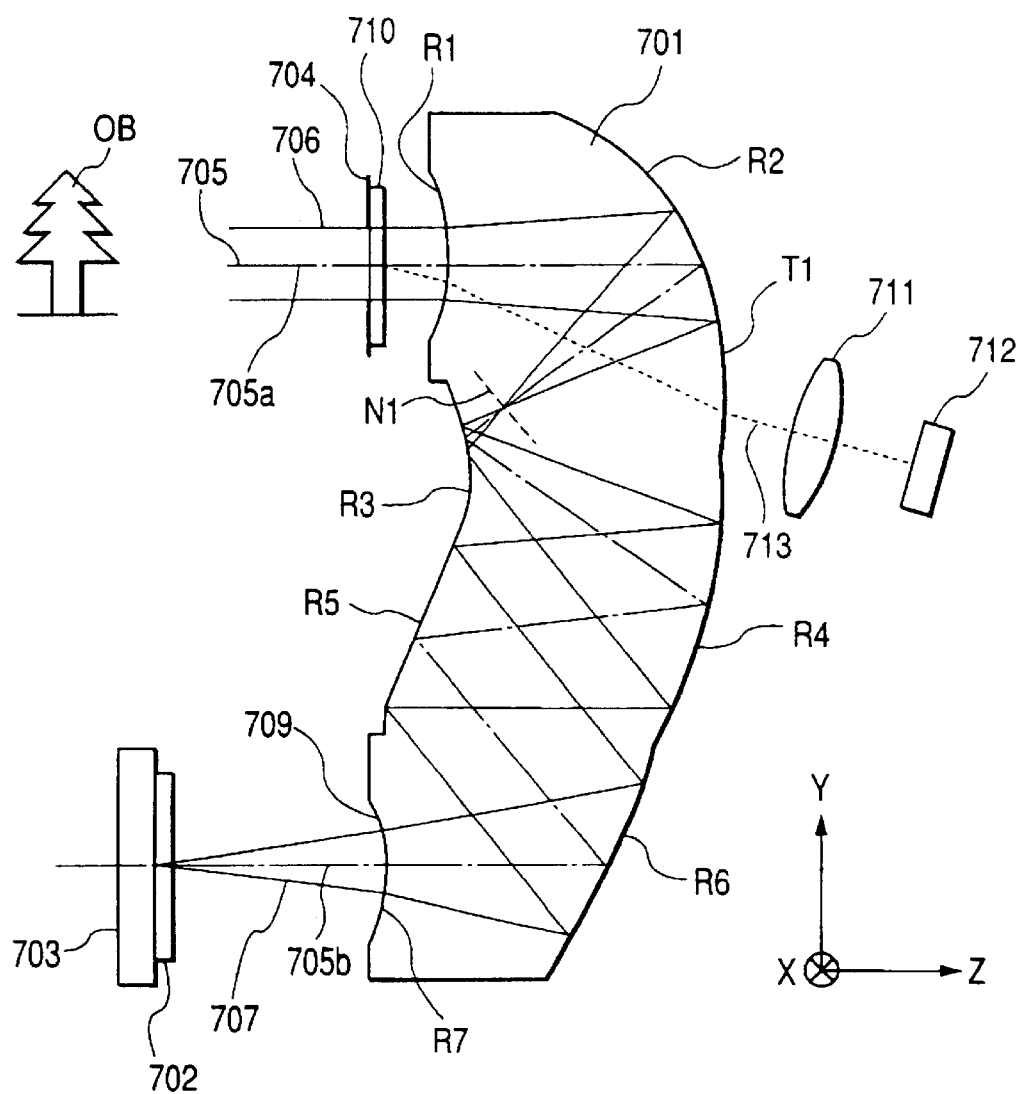
FIG. 12 is a sectional view to show the major part of an optical system of Embodiment 7.

FIG. 12 is a sectional view of the major part of Embodiment 7 of the optical system in the optical apparatus of the present invention.

In FIG. 12, numeral 701 designates the optical element in which the entrance and exit surfaces and a plurality of reflective surfaces having curvature are formed in integral form in the surfaces of the transparent body. In the same figure, the optical paths are also illustrated. The optical element 701 is made of an optically transparent material, such as an optical glass, an optical plastic material, or the like, having a concave, refractive surface (negative, refractive surface) R1 which is the entrance surface, five reflective surfaces which are a concave mirror R2, a convex mirror R3, a concave mirror R4, a convex mirror R5, and a concave mirror R6, and a convex, refractive surface (positive, refractive surface) R7 which is the exit surface, in the named order from the object side.

These surfaces are rotationally asymmetric, aspherical surfaces and compose a non-coaxial optical system, which is called an off-axial, optical system. Numeral 704 denotes a stop (entrance pupil) disposed on the object side of the optical element 701.

Numeral 702 denotes an optical low-pass filter made of quartz and an optical thin film having an infrared cut property is formed on the surface of the filter.

Numeral 703 denotes the final image plane, on which the image pickup surface of the image pickup element (image pickup medium), such as the two-dimensional CCD or the like, is positioned. Numeral 705 denotes the reference axis of the optical system.

T1 denotes a transmitting surface provided in part of the optical element 701. The transmitting surface T1 is provided in adjacent relation between the optically effective regions of the reflective surface R2 and the reflective surface R4 and the transmittance thereof is equivalent to that of the entrance surface R1 and the exit surface R2. Numeral 710 denotes a beam splitting means (optical means) comprised of a one-dimensional diffraction grating in which a phase grating is formed at equal pitch in the Y-direction in the figure. The diffraction grating 710 splits the incident light into the zero-order light and nth-order diffracted light. The zero-order light is used for photography, while the nth-order (first-order) diffracted light for photometry as described hereinafter.

Numeral 713 designates a beam of first-order diffracted light (only the center ray of which is illustrated) produced by the diffraction grating 710. Numeral 711 designates a condenser lens (sensor lens) and 712 denotes a photodetector.

The optical element 701 is made as follows; the body is integrally formed by injection molding with a mold, and thereafter a reflecting film is formed on each reflective surface while the surfaces R1, R7, T1 of the refractive surfaces are masked, and then an antireflection film is formed on the three refractive surfaces. Deposition of film can be carried out simultaneously on the opposite surfaces by electroless plating for the formation of the reflective film and by dip coating for the formation of the antireflection film; therefore, the production is much easier than by film formation using evaporation.

In the present embodiment, the reference axis 705 is defined as an optical path (a chain line) of a ray passing the center of the stop 704 and reaching the center of the final image plane 703. The direction of the reference axis 705a incident into the optical element 701 on the entrance surface R1 is approximately parallel and opposite to the direction of the reference axis 705b outgoing from the optical element 701 on the exit surface R7.

The imaging relation in the present embodiment will be described. The light 706 from the object OB is regulated in the amount of incident light by the stop 704 and thereafter is incident to the concave, refractive surface R1 of the optical element 701.

The object light 706 incident into the concave, refractive surface R1 is converted into diverging light by the power of the concave, refractive surface R1 and thereafter is reflected by the concave mirror R2 to primarily form a primary object image on the intermediate image plane N1 by the power of the concave mirror.

This imaging of the object image in the optical element 701 in the early stage restrains the increase in the ray-effective diameters of the surfaces disposed on the image side of the stop 704.

The object light 706 undergoing the primary imaging on the intermediate image plane N1 is repeatedly reflected by the convex mirror R3, the concave mirror R4, the convex mirror R5, and the concave mirror R6 while being affected by the powers of the respective reflecting mirrors, and the object light 706 then reaches the convex, refractive surface R7. The object light 706 refracted by the power of the convex, refractive surface R7 forms an object image on the image pickup element surface 703. In this way the optical element 701 functions as a lens unit having the desired optical performance and a positive power as a whole, while repeatedly effecting the refractions by the entrance and exit surfaces and the reflections by the plurality of reflecting mirrors having curvature. The focus adjustment (focusing) of the image detected by the CCD located on the final image plane is carried out by moving the image pickup element 703 in the Z-direction. The optical element 701, the condenser lens 711, and the photodetector 712 are fixed.

On the other hand, the incident light 706 is separated into the zero-order light and the first-order diffracted light by the diffraction grating 710. The first-order diffracted light among them travels as a separate beam 713 separated from the principal beam traveling along the reference axis 705, the separate beam 713 being incident into the refractive surface R1, traveling toward the transmitting surface T1 without reflection at the reflective surfaces R2, R3, and emerging from the transmitting surface T1 to the outside of the optical element 701.

The separate beam 713 thus emerging travels through the condenser lens 711 to enter the photodetector 712, which detects an amount of the light.

In the present embodiment the output of the photodetector 712 is used for dimming. Therefore, the dimming does not have to be carried out using the output of the image pickup element 703, so that the shutter time lag can be reduced without degrading not only the accuracy of dimming, but also the accuracy of photometry, white balance, and focusing.

The present embodiment showed the example of dimming by use of the separate beam, but the scope of application of the present invention is not limited to it.

For example, the output of the photodetector 712 can also be used for photometry. However, if the position of the photodetector is fixed, it is not easy to make a metering range of averaging metering, center-weighted metering, etc. adaptively variable. In that case, the function as the image pickup apparatus can be optimized by properly selecting a combination of the separate beam with the principal beam, for example, by carrying out the averaging metering of the highest occurrence frequency by use of the separate beam and carrying out the center-weighted metering etc. in another mode by use of the output of the image pickup element or the like.

In the case wherein the photodetector 712 to detect the separate beam is, for example, a three-divided element and wherein a color filter of R, G, or B is mounted on each segmental part, it can be used for automatic white balance. In this case, more accurate and quicker automatic white balance can be performed by a combination with the output of the image pickup element as a complementary color filter, for example.

As described, the scope of application of the present invention is not limited to the embodiments. Higher function can be achieved by carrying out an arithmetic operation in combination with the output of the image pickup element.

Further, it is also possible to carry out the detection of dimming, photometry, and white balance by a single photodetector. Specifically, in a structure for white balance, outputs of respective segmental elements of the photodetector are corrected and summed up and the result can be utilized as a signal for dimming and photometry.

As a result, the detection items and the sequence of the image pickup element are reduced, whereby the shutter time lag can be decreased considerably by the optical system of the present embodiment accordingly.

Figure 13:
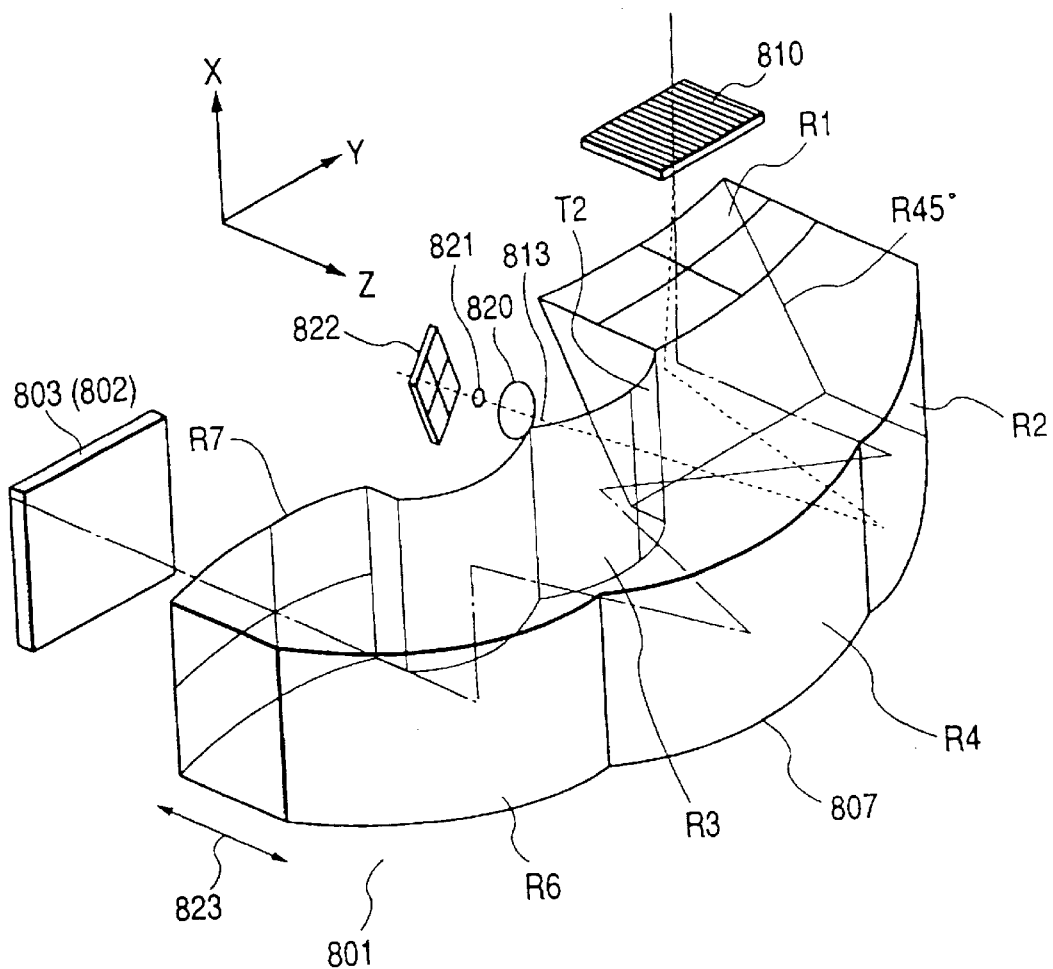
FIG. 13 is a perspective view to show the major part of an optical system of Embodiment 8.

FIG. 13 is a perspective view of the major part of the optical system in Embodiment 8 of the present invention. In contrast with the embodiment of FIG. 12, the present embodiment is different therefrom in that the light transmitted by the transmitting surface T2 of the optical element 801 is used for automatic focus detection and in that in accordance therewith, lens system 820 and photodetector 822 used herein are those for the automatic focus detection, and the other structure is basically the same.

FIG. 13 shows a state of detection to detect the focusing error signal from the separate beam.

In the present embodiment, the optical element 801 is formed by forming a pair of refractive surfaces for entrance and exit and reflective surface groups of a plurality of reflective surfaces with curvature in adjacent arrangement and in opposed relation in the surfaces of the transparent body.

In FIG. 13, a first reflective surface group 807 comprised of three reflective surfaces in the adjacent relation in the Y-direction, as illustrated in FIG. 13, is composed of a concave mirror R2 as the first reflective surface of the optical element 801, a concave mirror R4 as the third reflective surface, and a concave mirror R6 as the final reflective surface of the optical element 801, which are placed after the concave, refractive surface R1 to which the light from the object is incident.

Further, a second reflective surface group 808, comprised of two reflective surfaces formed in integral form and arranged in the Y-direction, is composed of a convex mirror R3 as the second reflective surface of the optical element 801 and a convex mirror R5 as the fourth reflective surface, which are formed in opposed relation to the first reflective surface group 807. The first reflective surface group 807, the second reflective surface group 808, and the entrance and exit refractive surfaces R1, R7 compose the optical element 801.

In the present embodiment, the generating line and the meridian line of the cylindrical lens, as a basis of the sensor lens 820, are in the YZ plane including the separate beam and in a plane being perpendicular thereto and including the X-axis, respectively.

Against it, each of the parting lines of the four-divided photodetector 822 is positioned at the inclination of 45° about the axis 813 of the separate beam relative to the YZ plane, as illustrated in FIG. 13. Numeral 821 denotes a stop.

Since the method of focusing control in the present embodiment is similar to that in Embodiments 3 and 4, it is omitted from the explanation herein.

Figure 14:
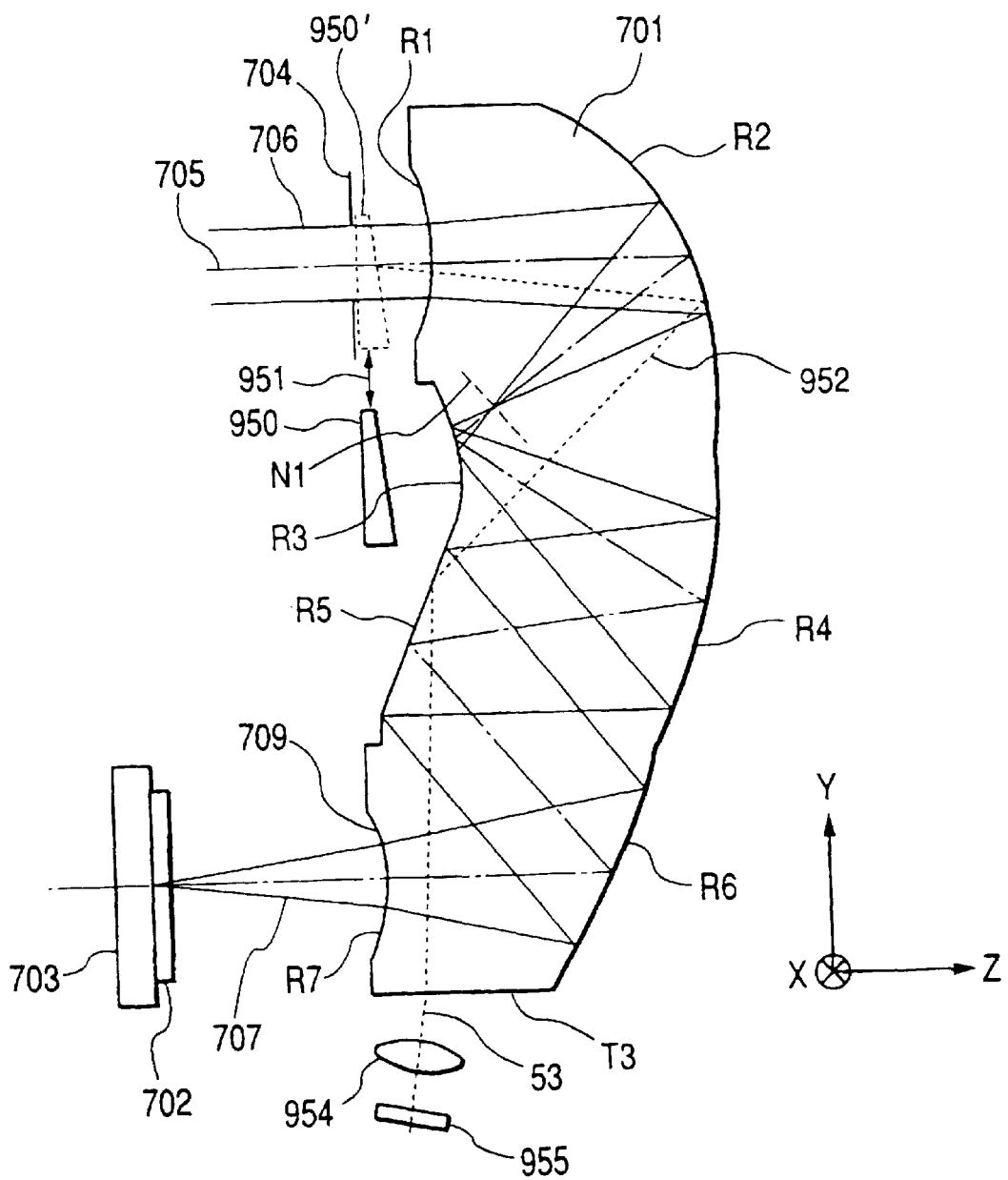
FIG. 14 is a sectional view to show the major part of an optical system of Embodiment 9.

FIG. 14 is a sectional view of the major part of Embodiment 9 of the optical system in the optical apparatus of the present invention. In contrast with Embodiment 7 of FIG. 12, the present embodiment is different therefrom in that the beam separating means is a deflecting prism 950 as a beam deflecting means that can be put into or out of the optical path, instead of the diffraction optical element and in that only when the deflecting prism 950 is put in the optical path, the light 953 for photometry indicated by a dashed line is made incident into the entrance surface R1 to be reflected by reflective surface R2 and reflective surface R5 and thereafter be transmitted by a transmitting surface T3 to be guided to a sensor lens 954, and the light is condensed by the sensor lens 954 to enter a sensor 955, and the other structure is the same.

During photography, the deflecting prism 950 is driven as indicated by an arrow 951 to be retracted from the optical path, whereby the optical element 901 forms the object image on the surface of CCD 903.

The present embodiment may also be modified so as to form the object image on the photodetector 955 and obtain the in-focus signal from the photodetector 955, as in the case of Embodiment 8.

As described above, the optical system and the optical apparatus using it can be constructed in the structure wherein the object image is formed on the predetermined surface by making use of the optical element comprised of the entrance surface to which the light is incident, the plurality of reflective surfaces having curvature, and the exit surface from which the light reflected by the plurality of reflective surfaces emerges, which are integrally formed in the surfaces of the transparent body, wherein part of the light is separated out by the beam splitting means provided near the entrance surface or the exit surface, wherein the separate beam is taken out of the surface except for the optically effective areas of the optical element, and the focusing error signal, and wherein the photometry signal, etc. are obtained by use of the separate beam thus taken out, while realizing the compact and simplified structure of the overall optical system.

In addition, the optical system and the optical apparatus incorporating it can be provided in the structure wherein the focusing error signal and photometry signal can be obtained readily with realizing compactification and simplification, by taking the separate beam out of the surface except for the optically effective areas of the optical element described above and providing the separate beam thus taken out with the predetermined optical property, and the detection items and sequence of the image pickup element are decreased as a result by carrying out the detection of dimming, photometry, white balance, and focusing error by use of the photodetector, so that the present invention presents the effect of capability of greatly decreasing the shutter time lag, and so on.

What is claimed is:

1. An image pickup system comprising:

an optical element having a plurality of reflective surfaces integrally formed, wherein at least one reflective surface out of the plurality of reflective surfaces of the optical element is a curved surface a normal to which at an intersecting point with a reference axis does not coincide with the reference axis;

an image pickup element to which light successively reflected by said plurality of reflective surfaces is incident;

optical means for making at least part of the light that ought to enter the image pickup element, travel in an optical path different from an optical path toward the image pickup element; and focus detecting means, said focus detecting means being arranged for detecting a focus point of said image pickup system by use of the light made to travel in said different optical path by said optical means, wherein the light made to travel in said different optical path by said optical means is utilized for a purpose other than image pickup by said image pickup element.

2. The image pickup system according to claim 1, wherein said optical means is one of said plurality of reflective surfaces of the optical element, which is a surface that transmits part of the light that ought to enter said image pickup element.

3. The image pickup system according to claim 2, wherein said optical means is a dichroic mirror that transmits light of a predetermined wavelength band out of the light that ought to enter said image pickup element.

4. The image pickup system according to claim 1, wherein said optical means is a diffracting optical element placed on the incidence side of said optical element.

5. The image pickup system according to claim 4, wherein light incident to said diffracting optical element is separated into a plurality of diffracted light beams of different orders, a diffracted light beam of a predetermined order out of said plurality of diffracted light beams is incident via said optical element on said image pickup element, and a diffracted light beam of another order different from said diffracted light beam of the predetermined order emerges via a part of said optical element from said optical element.

6. The image pickup system according to claim 1, wherein said optical means is a prism member placed on the incidence side of said optical element.

7. The image pickup system according to claim 6, wherein said prism member can be put into or out of an optical path of said optical system and wherein when said prism member is put in the optical path, said prism member deflects light incident thereto and the deflected light travels via a part of said optical element and emerges from said optical element.

8. The image pickup system according to claim 1, wherein the light made to travel in said different optical path by said optical means has different image positions in different directions in a plane normal to a traveling direction of the light.

9. An optical system comprising:

an optical element having a plurality of reflective surfaces integrally formed, wherein at least one reflective surface out of the plurality of reflective surfaces of the optical element is a curved surface a normal to which at an intersecting point with a reference axis does not coincide with the reference axis;

an image pickup element to which light successively reflected by said plurality of reflective surfaces is incident;

optical means for making at least part of the light that ought to enter the image pickup element, travel in a optical path different from an optical path toward the image pickup element; and photometering means, said photometering means being arranged for carrying out photometry by use of the light made to travel in said different optical path by said optical by said optical means, wherein the light made to travel in said different optical path by said optical means is utilized for a purpose other than image pickup by said image pickup element.

10. The optical system according to claim 9, wherein said optical means is one of said plurality of reflective surfaces of the optical element, which is a surface that transmits part of the light that ought to enter said image pickup element.

11. The optical system according to claim 10, wherein said optical means is a dichroic mirror that transmits light of a predetermined wavelength band out of the light that ought to enter said image pickup element.

12. The optical system according to claim 9, wherein said optical means is a diffracting optical element placed on the incidence side of said optical element.

13. The optical system according to claim 12, wherein light incident to said diffracting optical element is separated into a plurality of diffracted light beams of different orders, a diffracted light beam of a predetermined order out of said plurality of diffracted light beams is incident via said optical element on said image pickup element, and a diffracted light beam of another order different from said diffracted light beam of the predetermined order emerges via a part of said optical element from said optical element.

14. The optical system according to claim 9, wherein said optical means is a prism member placed on the incidence side of said optical element.

15. The optical system according to claim 14, wherein said prism member can be put into or out of an optical path of said optical system and wherein when said prism member is put in the optical path, said prism member deflects light incident thereto and the deflected light travels via a part of said optical element and emerges from said optical element.

16. An optical system comprising:

an optical element having a plurality of reflective surfaces integrally formed, wherein at least one reflective surface out of the plurality of reflective surfaces of the optical element is a curved surface a normal to which at an intersecting point with a reference axis does not coincide with the reference axis;

an image pickup element to which light successively reflected by said plurality of reflective surfaces is incident;

optical means for making a least part of the light that ought to enter the image pickup element, travel in an optical path different from an optical path toward the image pickup element; and a finder optical system having a reflective surface, the finder optical system deflecting, by the reflective surface thereof, the light made to travel in the optical path different from the optical path toward the image pickup element by said optical means so as to be guided to an observer, wherein the light made to travel in said different optical path by said optical means is utilized for a purpose other than image pickup by said image pickup element.

17. The optical system according to claim 16, wherein said optical means is one of said plurality of reflective surfaces of the optical element, which is a surface that transmits part of the light that ought to enter said image pickup element.

18. An image pickup system according to claim 16, wherein said finder optical system includes an optical element in which two refractive surfaces and said reflective surface are integrally formed, and said reflective surface of said optical element is a rotationally asymmetric aspherical surface.

* * * * *

UNITED STATES PATENT AND TRADEMARK OFFICE
CERTIFICATE OF CORRECTION

PATENT NO. : 6,324,012 B1
DATED : November 27, 2001
INVENTOR(S) : Michiharu Aratani et al.

It is certified that error appears in the above-identified patent and that said Letters Patent is hereby corrected as shown below:

<u>Column 15,</u>
Line 47, "element," should read -- element --.
Line 48, "element" should read -- element, --.

Signed and Sealed this

Thirtieth Day of July, 2002

Attest:

JAMES E. ROGAN
Attesting Officer     Director of the United States Patent and Trademark Office